DATA REDUCTION SYSTEM

Filed Oct. 26, 1964 8 Sheets-Sheet 1

INVENTORS
CLARENCE T. APPLE
CLINTON V. DAVIS, JR.
JAMES T. DERVAN III
LUKE F. LITTLE

BY Robert Lieber

ATTORNEY

Jan. 20, 1970 C. T. APPLE ET AL 3,490,690

DATA REDUCTION SYSTEM

Filed Oct. 26, 1964 8 Sheets-Sheet 3

Jan. 20, 1970 C. T. APPLE ET AL 3,490,690

DATA REDUCTION SYSTEM

Filed Oct. 26, 1964 8 Sheets-Sheet 6

Jan. 20, 1970 C. T. APPLE ET AL 3,490,690

DATA REDUCTION SYSTEM

Filed Oct. 26, 1964 8 Sheets-Sheet 7

Jan. 20, 1970 C. T. APPLE ET AL 3,490,690

DATA REDUCTION SYSTEM

Filed Oct. 26, 1964 8 Sheets-Sheet 8

United States Patent Office 3,490,690

Patented Jan. 20, 1970

3,490,690

DATA REDUCTION SYSTEM

Clarence T. Apple, Poughkeepsie, Luke F. Little, White Plains, James T. Dervan III, Pleasant Valley, and Clinton V. Davis, Jr., Kingston, N.Y., assignors to International Business Machines Corporation, New York, N.Y., a corporation of New York Filed Oct. 26, 1964, Ser. No. 406,462
Int. Cl. G06f *5/00*
U.S. Cl. 235—154 10 Claims

ABSTRACT OF THE DISCLOSURE

This real time data reduction system uses limited buffer storage, supplemental positionally encoded control code signals and supplemental tag signals to reduce and retime multi-word blocks of randomly timed binary data signals for efficient and continuous delivery to a tape store with fixed access period. Despite expansion of received word signals by the appended supplemental signals the subsequent reduction process provides an average reduction in block bits in the conversion from random input to tape storage.

This invention relates to systems for reducing information from one format into another more compact yet easily reconstructible format, for more efficient and for generally more economical handling.

In the reduction of information, prior practice has been to eliminate redundant information units by one of several techniques: In one of these, termed "run-length encoding," the number of consecutive redundant units of information is counted and selectively replaced by the count information, if the latter is more compact.

Another prior technique, applicable to the handling of television picture information, involves a frame to frame comparison of quantized information units which represent intensities of spots in the picture field. In this system the time or space allocated to the handling of information in one frame, or picture field, is not varied, but the number of frames during which the intensity of any spot remains invariant is encoded and transmitted in combination with information which represents the extent of the most recent variation in the intensity of the spot.

It is an object hereof to provide an information reduction system having improved performance characteristics and more general application in the data processing arts.

Another object is to provide an information reduction system in which sequentially organized plural-bit units of information are selectively retained or discarded, and in which the retained units are contiguously assembled, in space or time, or both, together with control information specifying the differences between the discarded units and corresponding units of previous sequences, into reversibly compacted output words of variable length.

Information is discussed herein in terms of bits, bytes, words, and blocks. A bit is a basic unit of binary information. Byte, as employed herein, denotes a predetermined plurality of bits which are not necessarily meaningful as a unit but which are handled internally, in the hereinafter disclosed embodiment of this invention, as a unit. Word is intended to denote a plurality of bits which are handled externally, either at the input or output of the said embodiment, as a unit. Input words are of fixed length and include a predetermined integral number of bytes. Output words are of variable length.

Still another object hereof is to compact data by retaining or selectively discarding invariant data bytes of input words, while indicating the retention or rejection of any data byte by control code bits, and by assembling the retained data bytes and the control code bits into continuous reversibly compacted sequences of output words of variable bit length.

Yet another object is to provide a reversible information compacting system in which bytes of input information are selectively discarded in favor of reduced first level, or primary control, information, and in which portions of the reduced primary control information are selectively discarded in favor of even more reduced higher level control information.

The foregoing and other objects are realized by providing data compacting apparatus including means for comparing correspondingly located bytes in successive input data words of fixed bit length, said comparing means being effective to produce binary outputs which constitute a primary control code. The bits of a primary code are each representative of the difference between the compared data bytes. The primary control codes of consecutive words are themselves subjected to a further comparison, in byte sets, to produce a secondary control code representative of the differences between compared primary control code bytes. Then the secondary control code, the non-redundant primary control bytes, and the non-redundant input data bytes are assembled contiguously into composite output words of variable bit length for compact further handling; for example, for compact storage of the information on tape. All redundant bytes are discarded.

The output words are stored contiguously on tape, in storage blocks of fixed length, and the stored information is subsequently reversely reassembled into its original format by first reconstructing the discarded (i.e. redundant) primary control bytes, with reference to both the current secondary control code and the primary control bytes of the previously reconstructed word, and by then reconstructing the discarded data bytes, with reference to both the associated current primary control bits and the corresponding data bytes of the previously reconstructed word.

The foregoing technique uses two levels of comparison to produce primary and secondary control information. This may be readily extended to three or more levels of comparison, yielding three or more progressively more compact sets of control signals in each output word. The arrangement which is best for any particular data reduction application will depend on the repetition pattern of the input data and the length of the input word. If the input data tends toward redundancy of data bytes in corresponding positions within consecutive long chains of bytes, a multi-level reduction might be considered desirable whereas if the pattern of repetition occurs in short chains of bytes, a two-level reduction will generally provide the most efficient compaction.

Realizing that a data reduction system, as characterized above, is adapted to convert input data words, or chains, of fixed length into composite output information words (secondary control-primary control-data) of variable length, it follows that some form of timing control must generally be provided for coordinating the disparate input and output signal flows. In the simplest situation input data can be supplied asynchronously on a demand basis and output information can be handled asynchronously on an availability basis, e.g. both the input and output information can be stored on punched tape and the coordinating controls would be correspondingly simple. In more general applications involving reduction of input data arriving at one arbitrary rate, and delivery of reduced data to a system operating at another rate, more elaborate and sophisticated coordinating controls are required. Thus it becomes necessary, for example, to provide elaborate buffer storage and timing coordinating circuits at strategic points along the data flow path, or, if some loss of input data can be tolerated—e.g. in coarse data monitoring applications—coordination may be achieved by allowing separate input and output timing controls to function independently, while maintaining "vacant-occupied" checks on the status of data buffer registers within the reducing system, and by inserting appropriate "lost data" or "no data" indications in the output data stream whenever one set of timing controls attempts to "overtake" the other.

In connection with this last feature another object hereof is to provide a data reduction system in which entire words of input data are conditionally discarded in order to maintain timing coordination, without affecting the reversibility of the reduction process, and in many instances, without significant loss of information. Another related object is to provide means for maintaining a continuous flow of data between an uncompressed data source and a compressed data sink operating at different characteristic rates, regardless of the availability of data at the source and the demand status of the sink.

For example, in practicing the invention, long sequences of program instructions which are in the process of being executed by a computer, are monitored, reduced, stored in compressed form, and later reconstituted (i.e. recovered) and analyzed. During such processing it has been noted by inspection that the recovered program information is reliably accurate and complete save for "gaps" due to "lost data" (i.e. words discarded to maintain timing coordination). The inclusion of "lost data" markers in the reduced output information is thus especially useful in the reconstruction of the compressed program because program instructions are usually arranged in predetermined sequences or routines such that a skilled technician can often supply the missing information by inspection.

Another unexpected and quite useful effect consequent to the practice of the subject invention is that hardware faults in the data reduction apparatus can be easily traced by a test conversion of a known data pattern to a known reduced data pattern. Because there is a predetermined sequential relationship between the control and data bits in the known reduced pattern, any deviation from this pattern is not only indicative of the presence of an error condition, but also it provides a basis for deducing the approximate circuit location of the malfunctioning part. For example, if only one control bit is in error and the corresponding data byte is correctly handled, it is most likely that the malfunctioning part will be located in the circuit which produced or handled only the wrong control bit and not in any circuit which handled other bits. As another example, in the herein disclosed embodiment of the invention the first four bits of each variable length word have thirteen meaningful, or legitimate, combinational states and three illegitimate states. Thus, the combined state of these four bits represent another error location deducing factor.

The foregoing and other objects, features and advantages of the invention will be apparent from the following more particular description of a preferred embodiment of the invention, as illustrated in the accompanying drawings.

Figure 1:
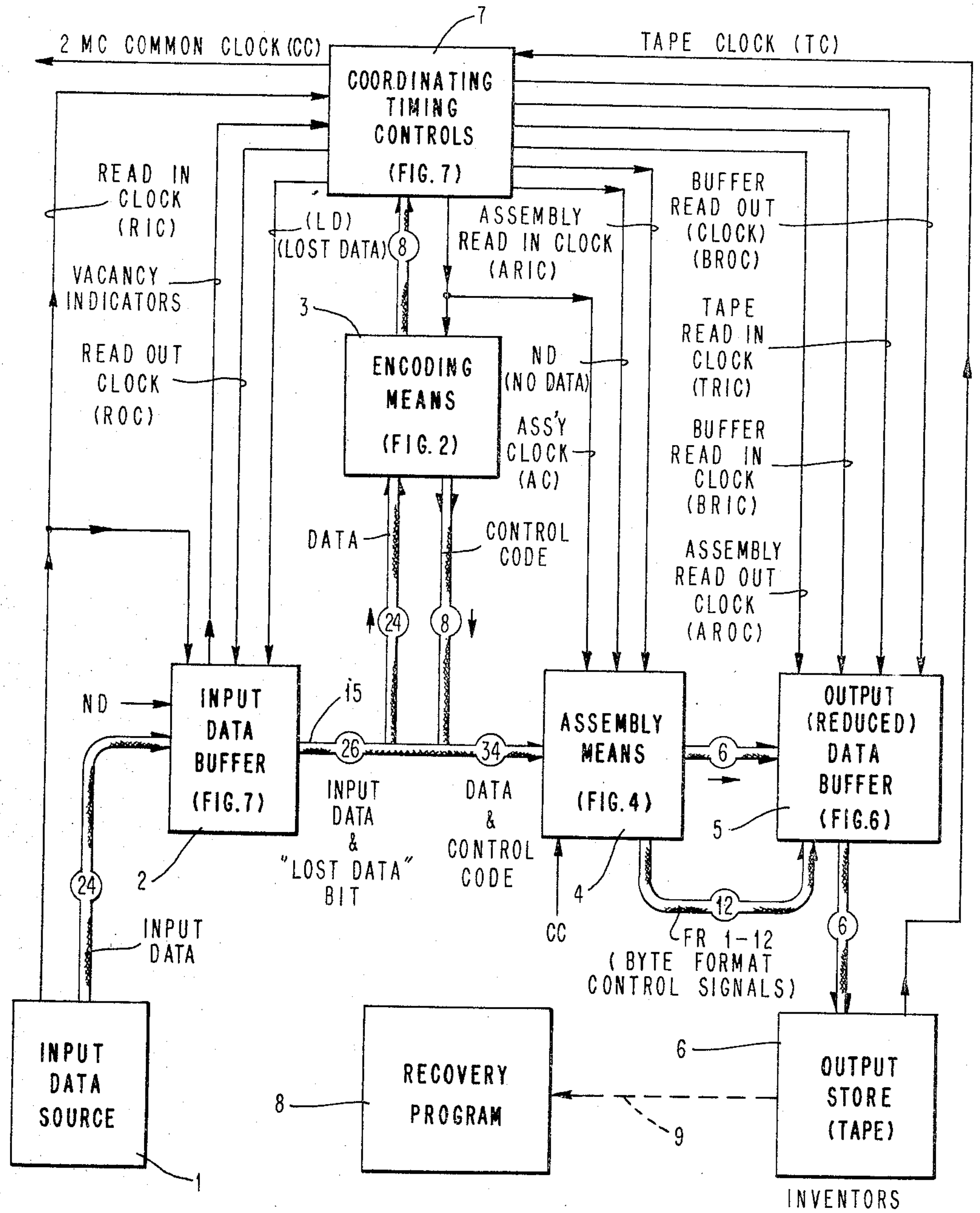
FIG. 1 is a generalized schematic block diagram of a system embodying all of the more general features which are considered characteristic of this invention.
Figure 7A:
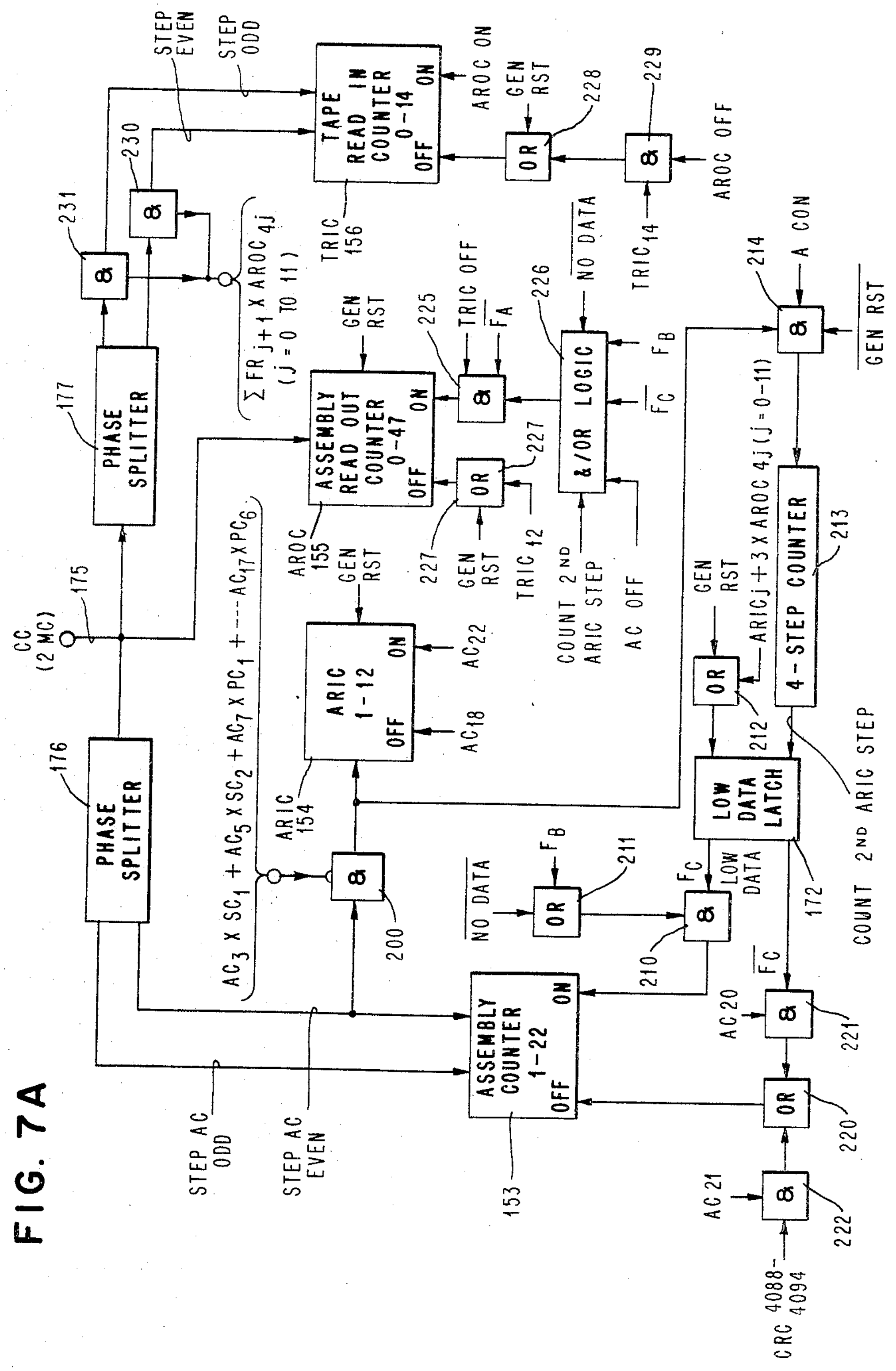
Figure 7B:
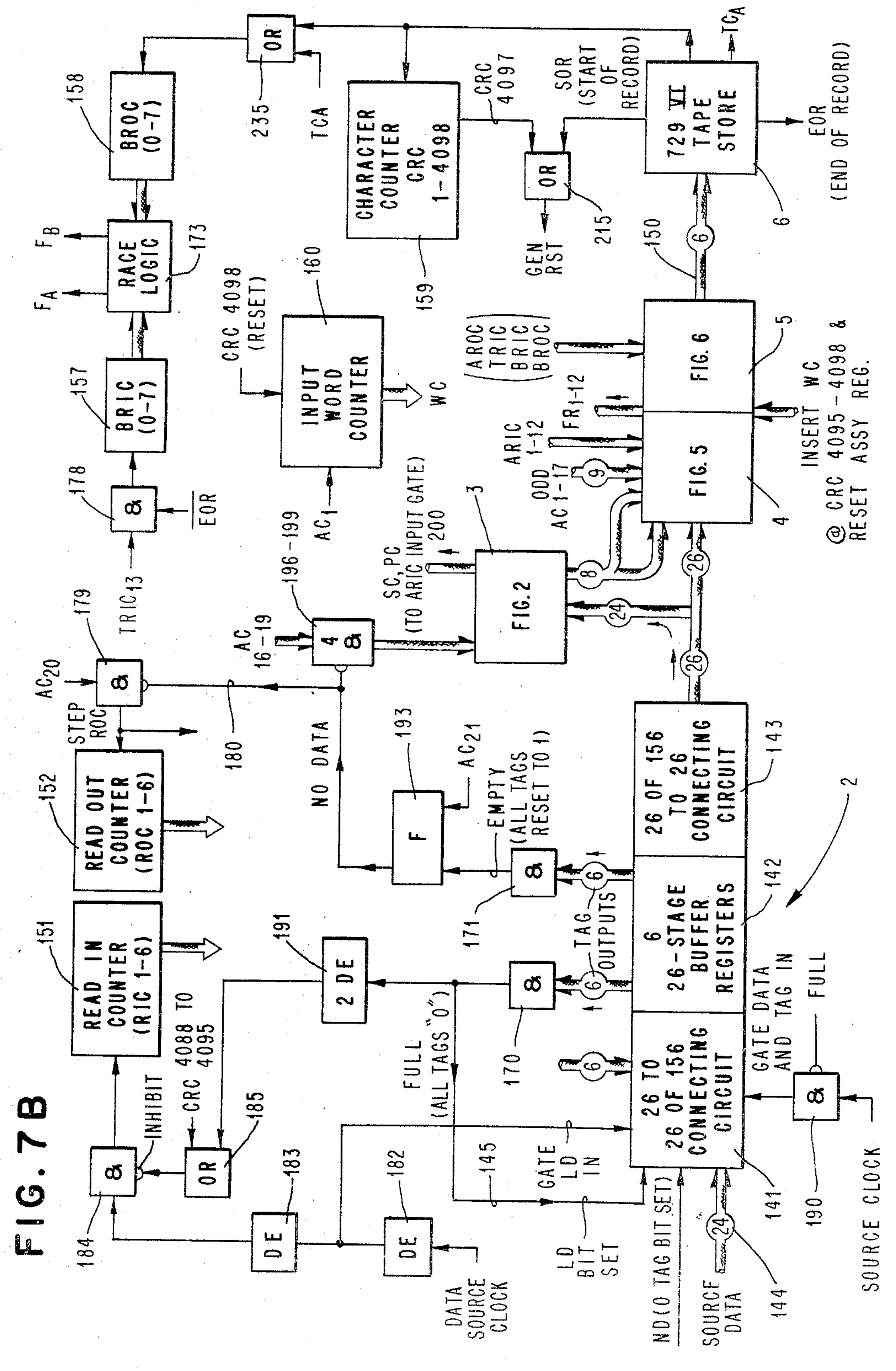
Figure 8A:
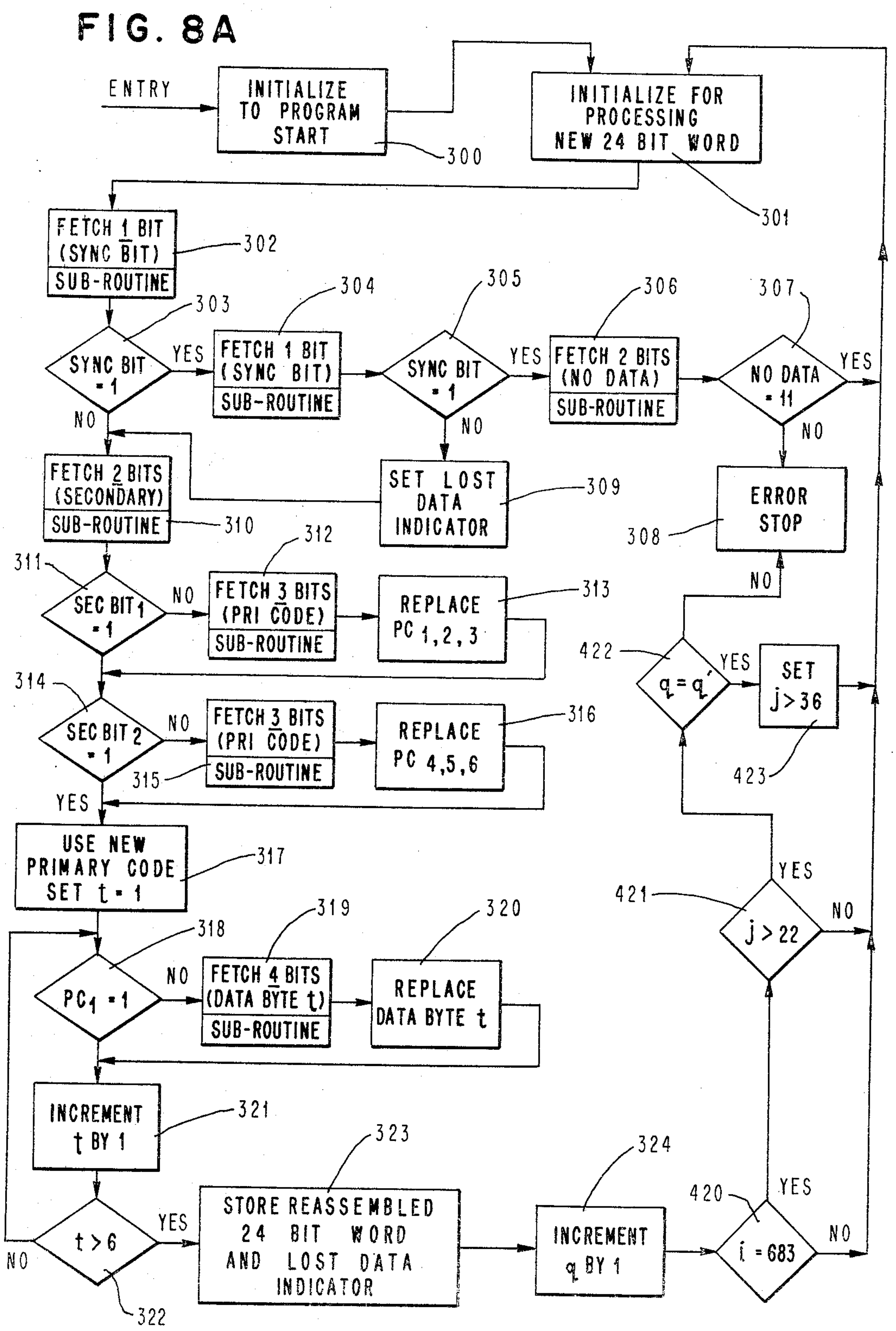
Figure 8B:
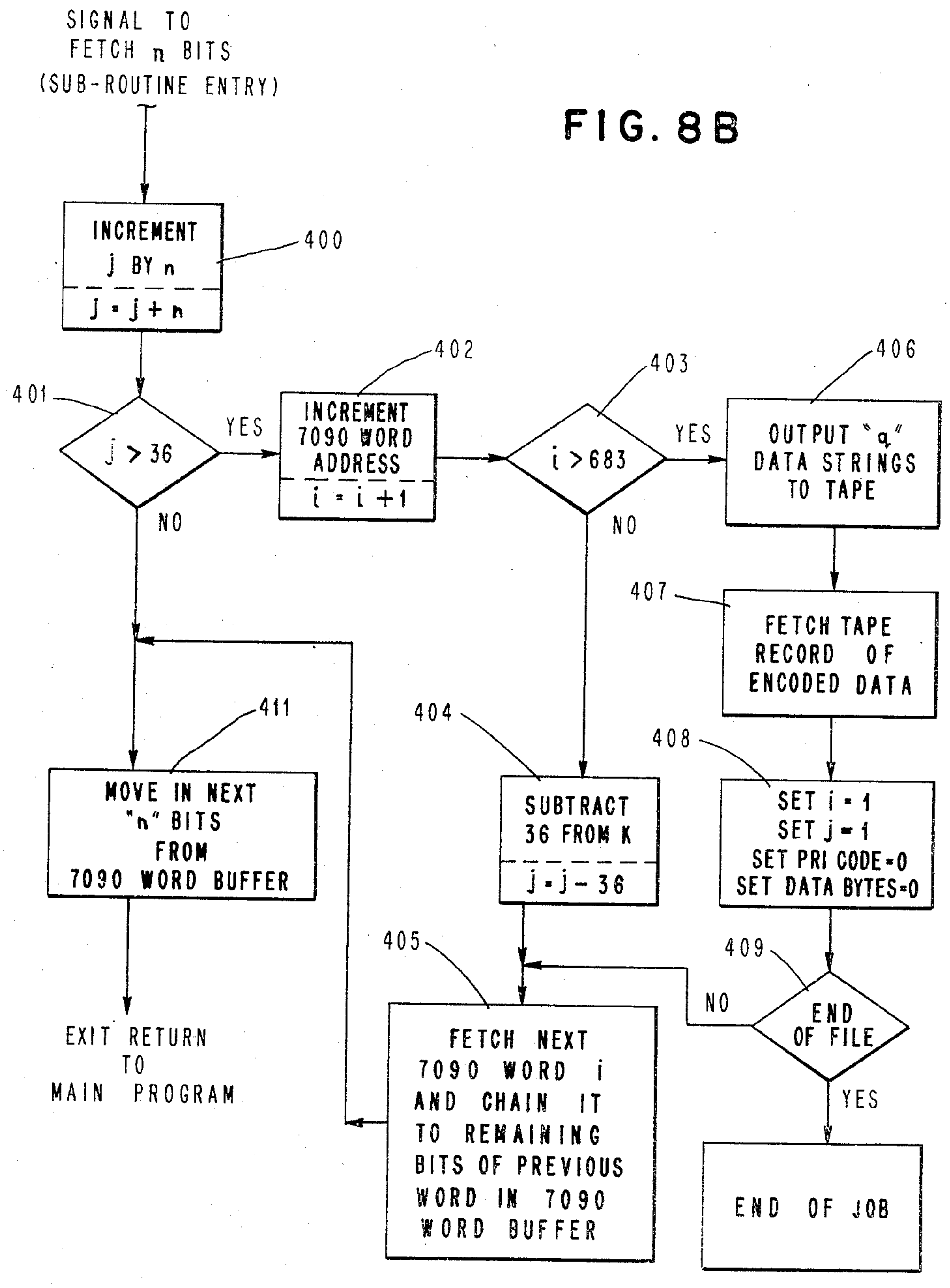

FIGS. 7A and 7B comprise a schematic drawing of the system shown in FIG. 1, illustrating details of the coordinating controls and input data buffers shown more generally in FIG. 1;

FIGS. 8A and 8B comprise a schematic block diagram illustrating the principal steps in a recovery program for reconstructing original fixed length words of information out of the reduced variable length words produced by apparatus of the type characterized in FIG. 1.

GENERAL DESCRIPTION

Referring to FIG. 1, a data reduction system constructed in accordance with the present invention is generally adapted to receive binary data from a data source 1, to partition the data, if necessary, into input word segments of equal length—in particular into 24-bit input words—to store it in input buffer apparatus 2, to generate control code information via encoding means 3, which is indicative of numerical differences between portions (i.e. bytes) of each current input word and corresponding portions of a previous word, and to assemble selected (i.e. non-redundant) portions of corresponding input words and control codes contiguously into variably compressed output words by means of assembly means 4. The compressed output words are then processed for deletion of additional extraneous bits and queued up contiguously in buffer storage means 5 from which a train of six-bit character units is delivered on demand to a tape store 6. Coordinating timing controls 7 control the flow of data between the relatively asynchronous source 1 and tape store 6.

In the subject embodiment words are each twenty-four bits in length. This should not be taken to mean that twenty-four bits necessarily comprise a meaningful unit of information, nor that the number twenty-four is particularly significant. It just happened to be efficient and convenient, for the application at hand, to divide the input data stream into twenty-four bit segments.

Buffer apparatus 2 comprises six 26-stage registers which are commutatively filled with 24-bit data words from source 1 and LOST DATA and NO DATA status indicating bits LD and ND, respectively. Bits LD and ND together with the 24-data bits are then processed as a 26-bit unit. Of these 26 bits, the 24 data bits are processed through encoding means 3 and all 26 bits are processed through assembly means 4.

The encoding means 3 internally treats each twenty-four bit data set as six four-bit data bytes, and for each such byte it produces a binary-valued control signal bit, hereinafter denoted primary code bit (PC), which is in a "1" condition if and only if the value of the associated data byte has not changed in relation to the value of the corresponding byte of the previous input word. Thus PC=0 if the associated byte has changed in value.

Thus, for a twenty-four bit (six byte) input word encoding apparatus 3 generates six primary code bits (PC 1–6) which are indicative of the redundancy status of the associated four-bit data bytes. Further, encoding means 3 internally treats each six-bit primary code PC1–6 as two three-bit primary code bytes (e.g. PC1–3 and PC4–6), and for each of the latter bytes it produces binary-valued control signal bits, hereinafter designated secondary code bits ($SC_1$ and $SC_2$), which are set in a "1" state if and only if the associated primary control byte has not changed in relation to the corresponding primary control byte of the previous input word, and in a "0" state otherwise.

Recapitulating, secondary code bits ($SC_{1,2}$) are derived as functions of respective three-bit primary code bytes ($PC_{1-3}$, $PC_{4-6}$) of two consecutive words, and the six primary code bits are individually derived as functions of six respective four-bit data bytes of two consecutive twenty-four bit input data words. Assembling means 4 assemblies bits LD, ND, $SC_1$, $SC_2$, selected ones of the primary code bytes $PC_{1-3}$ and $PC_{4-6}$, and selected ones of the six data bytes, into reversibly compressed information units by discarding selected PC bytes if the associated SC bits are "ones," and by discarding data bytes if the associated PC bits are "ones." The assembling means thus delivers at its output a continuous train of LD bits, ND bits, SC bits, selected PC bits, and selected data bits. The output of the assembling means is processed in six-bit units through buffers 5 comprising eight 6-bit buffer storage registers which are repeatedly filled and emptied in an asynchronous commutative sequence. The 6-bit compressed "character" units in the buffers 5 are deposited in parallel, together with a seventh parity bit, on a 7-track magnetic tape, in blocks of 4,098 characters, under the control of storage apparatus 6. When the original input information is needed the reduced information is selectively extracted from the tape in blocks and operated upon in a reverse manner, for example, by a programmed data processing system 8, as will be more particularly described hereinafter, to reconstruct first the complete primary code information and then the complete data byte information corresponding to each original data word.

The reduction accomplished by the encoding and assembly operations may best be understood by considering the example shown in Table I below. In the leftmost column of the table word numbers indicate the order of appearance and handling of words shown in other columns of the same rows. For each word the corresponding LD and ND bits are indicated in a vertical sequence in the next column to the right. Then corresponding SC bits are shown in a vertical sequence in the next column to the right of the LD, ND bits, and the associated PC bits are arranged vertically in the next column. The unprocessed input data word bytes are arranged vertically in the next four columns to the right of the primary code and the corresponding variable length compressed output is indicated in a single row, in the last four to thirty-four columns to the right.

For the sake of simplicity, each input data byte is shown in a separate row of the table together with its corresponding primary code bit, so that the six input bytes occupy six rows. As a further aid, the LD and SC bits of each word are placed in the same row as the first primary code bit ($PC_1$) for symmetry and to permit convenient comparison of $SC_1$ and $PC_{1-3}$, and ND and $SC_2$ are aligned with $PC_4$ for symmetry and convenient reference to $PC_{4-6}$. The output words each occupy a single line on which the first four output bits are respectively identical to LD, ND, $SC_1$ and $SC_2$.

TABLE 1

| Word # | LD<br>ND | SC<br>1<br>2 | PC<br>1<br>2<br>.<br>.<br>.<br>6 | Input Data Bytes | Reduced Output Word (4 to 34 bits) |
|---|---|---|---|---|---|
| 0 | 1 | 1 | 0 | 0000 | 1111 ("NO DATA" byte.) |
| | | | 0 | 0000 | |
| | | | 0 | 0000 | |
| | 1 | 1 | 0 | 0000 | |
| | | | 0 | 0000 | |
| | | | 0 | 0000 | |
| 1 | 0 | 1 | 0 | 1010 | 0011101010110011101110001001 (PC bytes discarded.) |
| | | | 0 | 1011 | |
| | | | 0 | 0011 | |
| | 0 | 1 | 0 | 1011 | |
| | | | 0 | 1000 | |
| | | | 0 | 1001 | |
| 2 | 0 | 0 | 1 | 1010 | 0000111111 (All data bytes discarded.) |
| | | | 1 | 1011 | |
| | | | 1 | 0011 | |
| | 0 | 0 | 1 | 1011 | |
| | | | 1 | 1000 | |
| | | | 1 | 1001 | |
| 3 | 0 | 0 | 0 | 1001 | 0000000000100110000000100100010110 (Worst case.) |
| | | | 0 | 1000 | |
| | | | 0 | 0000 | |
| | 0 | 0 | 0 | 1001 | |
| | | | 0 | 0001 | |
| | | | 0 | 0110 | |

TABLE I—Continued

| Word # | LD<br>ND | SC<br>1<br>2 | PC<br>1<br>2<br>.<br>.<br>.<br>6 | Input Data Bytes | Reduced Output Word (4 to 34 bits) |
|---|---|---|---|---|---|
| 4 | 0 | 0 | 1 | 1001 | 0001111101011111110 (PC byte 2 and Data bytes 1, 2, and 3 discarded.) |
| | | | 1 | 1000 | |
| | | | 1 | 0000 | |
| | 0 | 1 | 0 | 1010 | |
| | | | 0 | 1111 | |
| | | | 0 | 1110 | |
| 5 | 0 | 0 | 0 | 1010 | 000001011110100001 (Data bytes 2, 4, 5 and 6 discarded.) |
| | | | 1 | 1000 | |
| | | | 0 | 0001 | |
| | 0 | 0 | 1 | 1010 | |
| | | | 1 | 1111 | |
| | | | 1 | 1110 | |
| 6 | 1 | 0 | 1 | 1010 | 10011011011 (All but LD, ND, $SC_{1,2}$, $PC_{1-3}$, and data byte 2 discarded.) |
| | | | 0 | 1011 | |
| | | | 1 | 0001 | |
| | 0 | 1 | 1 | 1010 | |
| | | | 1 | 1111 | |
| | | | 1 | 1110 | |
| 7 | 0 | 0 | 1 | 1010 | 0001111 (All but SC and $PC_{1-3}$ discarded.) |
| | | | 1 | 1011 | |
| | | | 1 | 0001 | |
| | 0 | 1 | 1 | 1010 | |
| | | | 1 | 1111 | |
| | | | 1 | 1110 | |
| 8 | 0 | 1 | 1 | 1010 | 0011 (Best case—all but SC discarded.) |
| | | | 1 | 1011 | |
| | | | 1 | 0001 | |
| | 0 | 1 | 1 | 1010 | |
| | | | 1 | 1111 | |
| | | | 1 | 1110 | |

The first row of the table is characterized as word #0. In this word $PC_{1-6}$ and all data bits are 0, and LD, ND, SC, and $SC_2$ are all 1's. The output is a NO DATA byte 1111 formed by scanning only LD, ND, $SC_1$ and $SC_2$ in a manner to be explained hereinafter by apparatus shown in FIGS. 5, 7A and 7B.

In word #1 there is at least one binary "one" in each input data byte. Thus the value of each data byte has changed relative to the reset value, and the primary code remains all "zeros." Since the primary code has not changed the secondary code is "11" and both of the 3-bit PC bytes are deleted from the output word. This is particularly interesting because intuitively it would be reasonable to expect that if all data bytes in the first word have changed values the output word would include not only all of the data bytes but also ten control bits LD, ND, SC and PC; a total of thirty-four bits. Thus, an effective "reduction" of six bits is anticipated in the handling of the first 24-bit data word and its associated 10-bit control code, although there are actually four more bits in the output word than there are in the input word. LD is 0 indicating that no loss of data has occurred between word 1 and word 2. ND is a 0 indicating that data is being processed, in contrast to the "NO DATA" status at word #0.

Input word #2 is the same as input data word #1. Hence, the corresponding primary code bytes $PC_{1-3}$ and $PC_{4-6}$ are "111" and "111," respectively. Since this represents a change in both PC bytes, the corresponding secondary code bits are each 0. Thus, in output word #2 the PC bytes are retained but all data bytes are omitted. LD and ND remain 0 as in word #1. Input word #3 represents a "worst case" condition. Every data byte has changed, and therefore every PC bit is changed to "0." Thus, the output word includes all of the 34 data and control bits. It is interesting to note, however, that the input words numbered 1 to 3 represent a total of $24 \times 3 = 72$ data bits while the corresponding output words 1 to 3 have a total of $28+10+34=72$ contiguous control and data bits. Thus, there would be no increase in total bits processed even under the extreme condition of fluctuation represented by these three words. It is noted that in general the output will be stored in blocks of $4098 \times 6 = 24,588$ bits of which $4088 \times 6 = 24,528$ bits, will correspond to input data, and 60 bits will be reserved for indicating the number of corresponding input words. It has been observed in practice that the 24,528 bits will represent at least 2,000 24-bit words (i.e. 48,000 bits). Tests have shown that the average ratio of input to output bits in most practical applications should be greater than 2 to 1. Thus, despite the apparent absence of a reduction in words 1 to 3 of the table, it should be borne in mind that in a block of reasonable size, there will be a significant compression effect.

In input word #4 the first three data bytes have not changed, but the last three data bytes have changed. Thus, the first primary code byte $PC_{1-3}$ changes to 111 but the second primary code byte $PC_{4-6}$ remains 000. Accordingly, the secondary code bits are respectively 0 and 1 (change and no change), and in output word #4 the unchanged primary code byte $PC_{4-6}$ and the unchanged first three data bytes are omitted.

In input word #5 only the first and third data bytes are different and therefore the primary code is "010111." This represents a change in each primary code byte and therefore the secondary code is "00." Thus, $PC_{1-6}$ and data bytes 1 and 3 are retained, and data bytes 2, 4, 5, and 6 are discarded, in forming output word #5.

In input word #6 only the second data byte differs from the corresponding byte of the previous word. Because of this the primary code is changed from "010111" to "101111." This represents a change only in primary code byte $PC_{1-3}$. Hence the secondary code is "01," and only $PC_{1-3}$ and data byte 2 are ertained with the LD, ND and SC bits in forming output word #6.

In all of the output words1 to 8, the second (ND) bit, variously referred to hereinafter as the TAG bit, or as the NO DATA bit (when it is 1) or the SYNCH (when it is 0), remains set at 0, indicating that the source is currently delivering data at a sufficient rate to meet the demands of the tape storge sink. Similarly, in all but word #6 the first (LD) bit, alternatively designated as the LOST DATA bit, is 0 indicating continuity between all words except 6 and 7. The 1 LD bit in word #6 indicates a loss (discarding) of one or more 24 bit data words at the source to keep pace with the demand rate of the store which has been apparently "outraced" by the supply rate of the source at the time of processing of word #6. Thus, a uniform flow if bits between the source and store has been maintained, and by inspection of words 6 and 7, when reconstituted, it is yet possible to interpolate the missing words.

Input words #7 and #8 are the same as input word #6. Thus, in word #7 the second primary code bit $PC_2$ changes from 0 to 1 and the secondary code remains "01." Hence, only the first primary code byte is retained in output word #7. In the "best" case input word #8 and its associated primary code are both unchanged, and therefore output word #8 reduces to the LD, ND, and secondary code bit sequence 011.

It is interesting to note that in the above example the 8 input words represent a total of $8\times24=192$ data bits, while the corresponding 8 output words represent a total of only $28+10+34+19+18+11+8+4=131$ bits; a net reduction of 61 bits, or an average of 7.625 bits per input word.

For the particular application under consideration herein it was found to be more expedient to reconstruct the information taken from the output magnetic tape by means of a programmed general purpose processor, rather than by special purpose apparatus, because in general reconstruction does not involve the variable source and storage timing conditions which pertain to the reduction of the original data. Also, in general it will not be necessary to reconstruct all of the recorded information because in general some of the original input information will not be of interest. For example, assume that the original input information words represent instructions in a program of instructions being executed on a source computer, and that it is required to record these instructions as they are executed, so that the recording may later serve as a "de-bugging" or evaluation check on the efficiency and/or utility of the program. While it is desirable for this purpose to be able to record all of the instructions in a reduced and compacted format, it is usually necessary to reconstruct only "troublesome" segments of the program; for example, a segment representing a subroutine which appears to utilize more than an expected amount of computer time. It would, therefore, be inexpedient to provide special purpose recovery equipment for dealing with the many variable data recovery situations which could arise and which might require special innovations depending on the circumstances, whereas the apparatus shown in FIGS. 1 to 7 will function satisfactorily for many different types of data sources and many different storage devices. The recovery program is indicated schematically at 8 in FIG. 1, and the link between the storage tape and this program is represented schematically by the dotted line 9. Basic elements, or steps, in the recovery program illustrated in block form in FIGS. 8A and 8B, are discussed hereinafter. Details of the blocks shown in FIG. 1 are next described below in varying scope.

ENCODING MEANS

Figure 2:
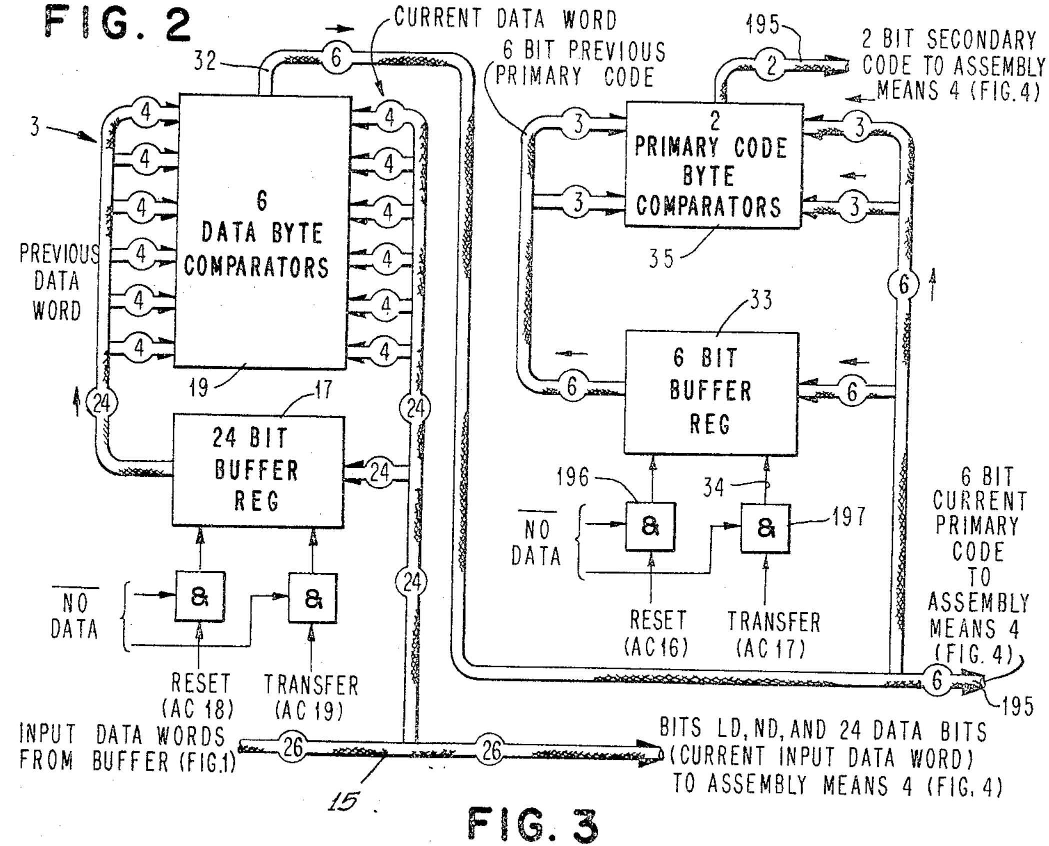
FIG. 2 is a schematic drawing illustrating details of the encoding means shown as a single block in FIG. 1.
Figure 3:
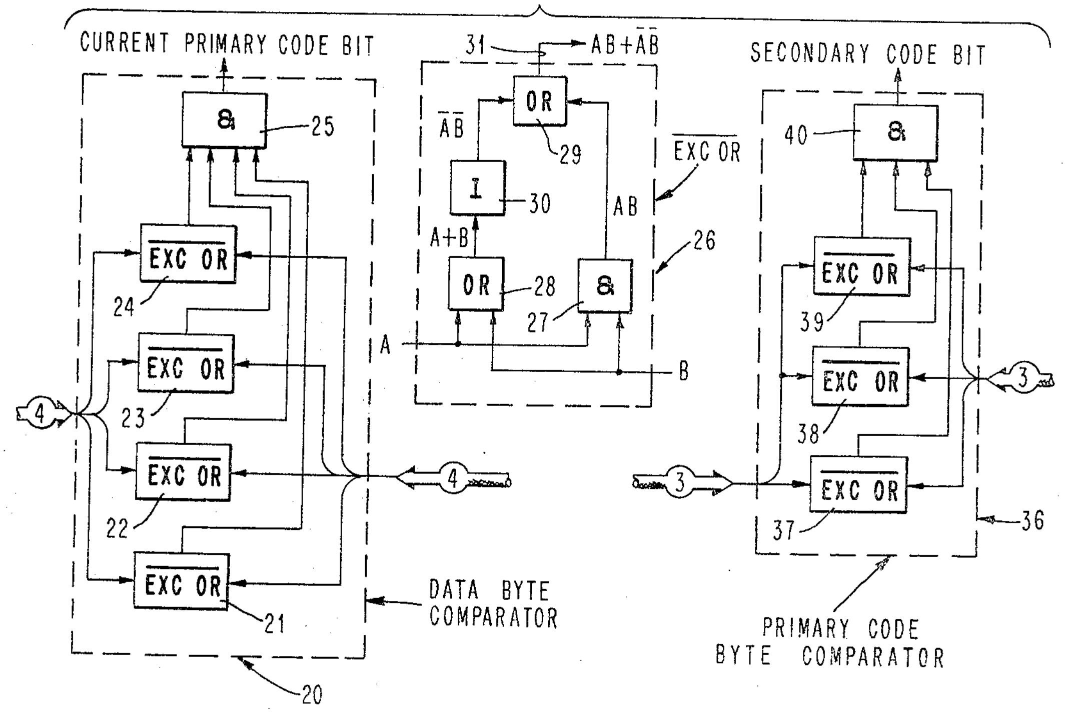
FIG. 3 is a schematic drawing illustrating details of the byte comparators shown in composite blocks in FIG. 2.

Referring to FIGS. 2 and 3, encoding means 2 functions to derive primary and secondary data reduction control codes as follows. The twenty-four bit input data words are sequentially transferred in parallel, via buses 15 and 16, into a 24-stage buffer register 17. Each such transfer is controlled by a transfer gating pulse conditionally applied at 18 at a predetermined time following the processing of the same data word through the assembly means 4 shown schematically in FIG. 4. The six four-bit bytes of each current and previous input data word (i.e. the inputs and outputs of register 17 are respectively coupled to six identical data byte comparators 19, one of which is shown in detail at 20 in FIG. 3.

Each data byte comparator is seen (FIG. 3) to comprise four Inverse-Exclusive-Or circuits 21 to 24, each having two inputs and one output, and an AND circuit 25 having four inputs respectively connected to the four outputs of the circuits 21 to 24. Each Inverse-Exclusive-Or circuit, as shown at 26 in FIG. 3 comprises an AND circuit 27, two Or-circuits 28 and 29, and an inverter or complementing circuit 30. Denoting the inputs to circuit 26 as A and B, the output 31 is represented by $AB+\overline{AB}$; (i.e. output 31 is "1" if, and only if, A and B are equal, and "0" otherwise). Since the outputs of circuits 21 to 24 are "ANDED" together at 25 the PC bit output of comparator 20 is "1," if, and only if, all four pairs of Ex-clusive-Or inputs are coincidentally matched, and therefore the six PC bit outputs on bus 32 (FIG. 2) are each "1," if and only if, the respectively compared 4-bit data byte are equal, and "0" otherwise.

Figures 4, 5:
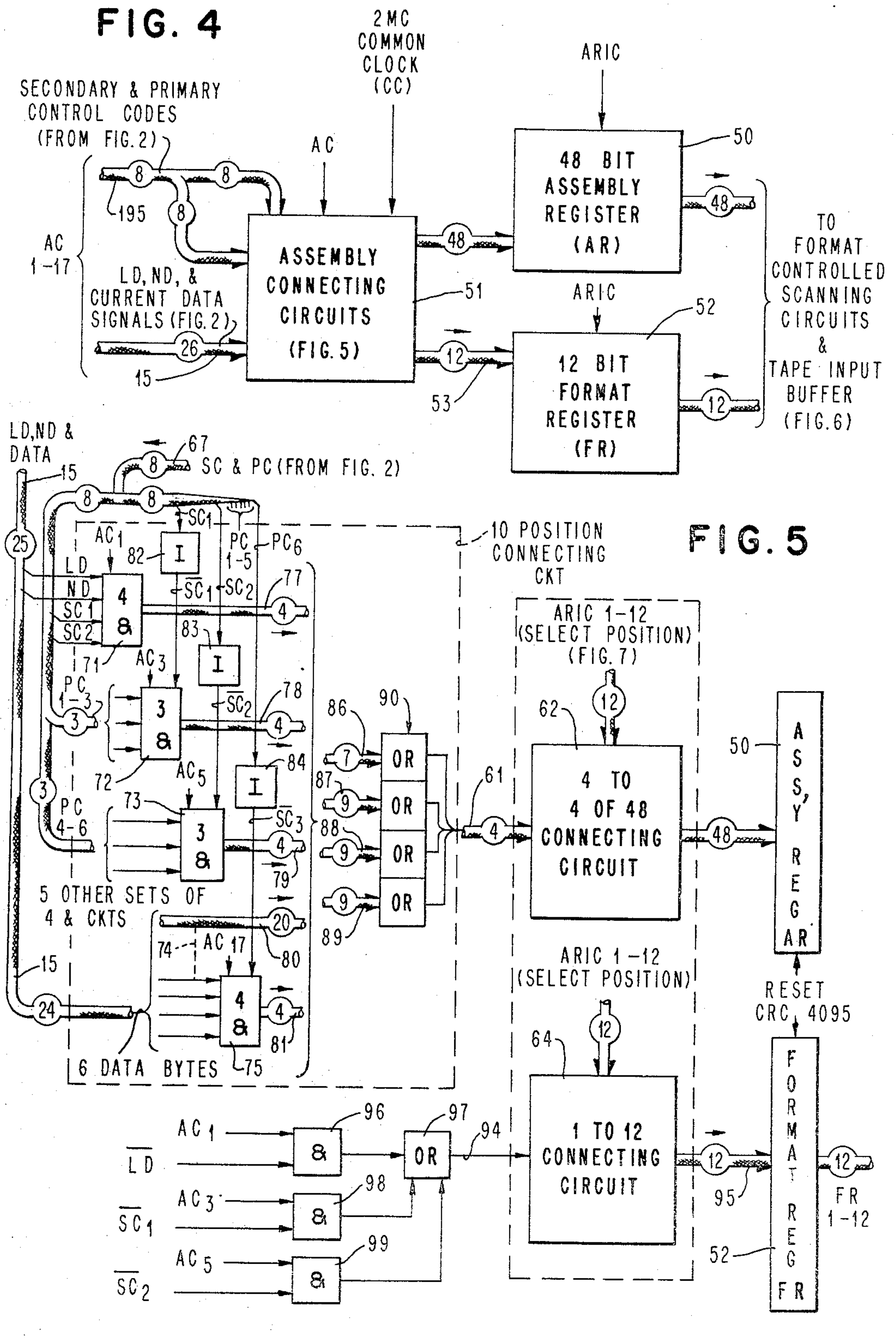
FIG. 4 is a schematic drawing illustrating the principal parts of reduced information assembling means, as described hereinafter with reference to FIG. 1.
FIG. 5 is a more detailed schematic block diagram of the assembling means of FIG. 4.

Each 6-bit primary code on bus 32 is transferred in parallel to the assembly apparatus shown in FIG. 4, and to a six-bit buffer register 33, under the control of a gating signal conditionally applied at 34. Thus, the inputs to, and outputs of register 33 immediately prior to the gating signal, respectively represent the primary codes corresponding to consecutive current and previous data words. The inputs to, and outputs of register 33, are compared in two 3-byte groups by two primary code comparators 35, the two outputs of which, immediately prior to the gating pulse at 34, represent the secondary code of the current data word. The primary code byte comparators are all identical and each is constructed as shown at 36 in FIG. 3. Comparator 36, FIG. 3, is substantially identical to data byte comparator 20 in the same figure except that the former has only three pairs of inputs, and therefore only three Inverse-Exclusive-Or circuits 37–39, whereas the latter has four. Consequently AND circuit 40 of comparator 36 delivers a "1" SC bit output if, and only if, its three pairs of inputs are respectively, and coincidentally, matched.

ASSEMBLY MEANS—GENERAL

Referring to FIG. 4, the current secondary code, and selected bytes of the current primary code and data word, together with coordinating information in the form of LD and ND bits which are generated by means discussed hereinafter, are assembled contiguously four bits at a time in a 48-stage assembly register 50, by means of assembly connecting circuits 51. The circuits 51 are effective to delete redundant 3-bit primary code bytes and 4-bit data code bytes, so that only the coordinating information, the secondary code bits, and non-redundant primary code and data bytes, in that order, are placed contiguously into successive four-stage sub-registers in the register 50.

The format and handling of the information as it is passed through the assembly logic 51, are explained with reference to Table 2 below.

TABLE 2

| No Data Controls | Assembly Clock Phase | Information Byte Bit 1 | Bit 2 | Bit 3 | Bit 4 | Assoc. Control Code Bit |
|---|---|---|---|---|---|---|
| 1 | $AC_1$ | 1 (LD) | 1 (ND) ("NO DATA" Code Byte) | 1 ($SC_1$) | 1 ($SC_2$) | |
| 0 | $AC_1$ | 1 (LOST DATA bit) or 0 (DON'T CARE). | 0 (Output word synch bit.) | $SC_1$ | $SC_2$ | |
| | $AC_3$ | X (DON'T CARE) | $PC_1$ | $PC_2$ | $PC_3$ | $SC_1$ |
| | $AC_5$ | X (DON'T CARE) | $PC_4$ | $PC_5$ | $PC_6$ | $SC_2$ |
| | $AC_7$ | Data Bit 1 | Data Bit 2 | Data Bit 3 | Data Bit 4 | $PC_1$ |
| | $AC_9$ | Data Bit 5 | Data Bit 6 | Data Bit 7 | Data Bit 8 | $PC_2$ |
| | $AC_{11}$ | Data Bit 9 | Data Bit 10 | Data Bit 11 | Data Bit 12 | $PC_3$ |
| | $AC_{13}$ | Data Bit 13 | Data Bit 14 | Data Bit 15 | Data Bit 16 | $PC_4$ |
| | $AC_{15}$ | Data Bit 17 | Data Bit 18 | Data Bit 19 | Data Bit 20 | $PC_5$ |
| | $AC_{17}$ | Data Bit 21 | Data Bit 22 | Data Bit 23 | Data Bit 24 | $PC_6$ |

In assembly read-in, four-bit bytes of information are selectively transferred into successive four-stage sub-registers of the register 50 in a commutative sequence and in one of two cyclic modes. In mode 1 (NO DATA controls set to 1) the input data buffers 2 (FIG. 1) are all vacant and therefore can not supply data signals on bus 15. Consequently, the read-in connecting circuits within block 51 are gated to scan only the LD, ND and SC lines of the 26 line input bus 15 during one full cycle of a 22-phase assembly clock counter (AC) contained within the circuits 7 (FIG. 1). In this mode, by virtue of the conditions set on the LD, ND, and SC lines by the circuits of FIG. 7, for each cycle of AC a NO DATA byte 1111 is gated into the outgoing information stream at phase 1 of the AC cycle and the connecting circuits 51 are held quiescent for the other 21 phases whereby only one four-bit cell in register 51 is filled.

In mode 0 (NO DATA controls set to 0) AC is stepped cyclically through phases 1–22, and in the odd-numbered ones, 1–17, of these phases the control code and data bits are selectively transferred into register 50 in four-bit byte units.

In phase 1 of this mode ($AC_1$) the byte handled by the circuits 51 is composed of the LD bit, which is either a "1" ("LOST DATA" indicator) or a "0" ("DON'T CARE") depending upon whether or not data following the current input word has been discarded at the input buffer 2 (FIGS. 1 and 7) in order to maintain timing coordination between the timing controls of source 1 and tape store 6 (FIGS. 1 and 7), the ND bit, which is invariably a 0 (Synch bit), and the $SC_1$ and $SC_2$ bits.

In phase $AC_3$ the first bit position is occupied by a "filler," or "DON'T CARE" bit X, and the other three places are occupied by the first three primary code bits $PC_1$, $PC_2$, and $PC_3$. Similarly, in phase $AC_5$, a "DON'T CARE" bit X, and the last three primary code bits, $PC_4$, $PC_5$, and $PC_6$, are handled.

Then in phases $AC_7$, $AC_9$, $AC_{11}$, $AC_{13}$, $AC_{15}$, and $AC_{17}$, the six bytes of input data are handled in sequence.

With the exception of "NO DATA" and mode 0 secondary code bytes, in each cycle of the AC counter bytes are selectively discarded or transferred in accordance with the value of the SC and PC associated control code bits, and each transferred byte is placed in a successive one of twelve four-stage sub-registers in the register 50. In correspondence with each such transfer a format bit is entered in parallel into a corresponding one of twelve stages in a format register 52, via the 12-wire bus connection shown schematically at 53. The format bit is set to "1" in the transferred byte contains only three bits of useful information; that is, if the first bit is a "DON'T CARE" bit (i.e. a "0" in phase $AC_1$ or any value X in phase $AC_3$ or $AC_5$). Otherwise the format bit is a "0."

Thus, the format register output defines the format of the information held in the twelve corresponding four-stage sub-registers of the 48-stage register 50. Utilizing this information, scanning circuits shown in FIG. 6 (and described below) effect a further reduction of the output information while cyclically scaning the outputs of register 50 one bit at a time, by selectively discarding the X "DON'T CARE" bits of the three-bit bytes. As is further shown in FIG. 6 (described below) the scanned output bits taken from register 50 are placed contiguously in eight 6-stage buffer registers, from which they are directly transferred in parallel 6-bit character groups onto six respective tracks of a magnetic tape record.

ASSEMBLY MEANS—PARTICULARS

Referring to FIG. 5 for details of the logic system generally characterized in FIG. 4, connecting circuit 60 is conditionally operable to selectively connect four of thirty-four inputs to a 4-wire output bus 61 in a predetermined cyclic scanning sequence. The signals on bus 61 are further transferred, through a 4 to 4 out of 48 connecting circuit 62, into a sequentially selected four stage sub-register of assembly register 50. Coincidentally and in correspondence with each transfer of signals into register 50, a 1 to 12 connecting circuit 64 operates to transfer a format signal into a corresponding one of 12 stages of the format register 52, in a manner discussed below.

Concentrating on circuit 60, information signals are fed horizontally into the circuit from the left and gate control signals are fed vertically into the circuit from above. Thus it will be seen that the SC and PC control code bits pass both as horizontal information inputs through the bus 66, and as vertical control inputs through the bus 67, into circuit 60. Basically, circuit 60 comprises 34 AND circuits, 9 inverting circuits, and 4 OR circuits. The 34 AND circuits denoted by the reference numerals 71–75, are arranged in seven groups of four circuits and two groups of three circuits. Of these groups only four, 71, 72, 73, and 75 are identified specifically in the drawing. The five missing sets of AND circuits are denoted schematically by dots at 74. Four AND circuits 71 conditionally connect the LD, ND, $SC_1$ and $SC_2$ bit signals to respective lines in 4-line bus 77. Three AND-circuits 72 conditionally connect bits $PC_{1-3}$ to respective lines in three line bus 78. Three AND-circuits 73 conditionally connect $PC_{4-6}$ to respective lines in three line bus 79. Four AND circuits in each of five groups at 74 conditionally connect their respective inputs (the first, second, third, fourth, and fifth data bytes) to five respective four line buses at 80. Last, four AND circuits 75 conditionally connect their respective inputs (the sixth data byte) to the 4-wire bus 81.

The two secondary and six primary code bit carrying lines extending from control bus 67 are connected to 8 respective inverting circuits indicated by reference numerals 82 to 84, the outputs of which are applied as control inputs to respective ones of the eight AND circuits 72–75. For timing control, the nine odd numbered phase outputs from 1 to 17—denoted $AC_1$, $AC_3$ . . . $AC_{17}$—of a 22-state assembly counter AC (FIG. 7) are applied to respective ones of the nine groups of gates 71–75. Thus, during commutation of the 22-state counter AC the nine groups of AND gates 71–75 are sequentially addressed.

The 34 lines in the nine buses 77–81 are regrouped into a 7-line bus 86 and three 9-line buses 87–89, according to the following plan. The line which carries the gated LD bit in bus 77 and lines carrying a first of four bits in each gated data byte are assembled into bus 86. The lines which carry the gated ND bit in bus 77, gated bit $PC_1$ in bus 78, gated bit $PC_4$ in bus 79 and second bits of the six gated data bytes in buses 80–81, are assembled into bus 87. The lines which carry the gated $SC_1$, $PC_2$, $PC_5$, and third data bits of each gated data byte are assembled into bus 88. Last, the lines which carry $SC_2$, $PC_3$, $PC_6$, and fourth bits of each data byte, are assembled into bus 89.

Buses 86 to 89 connect to respective ones of four OR circuits indicated generally at 90. The four outputs of these OR circuits connect through bus 61 to connecting circuit 62 which contains twelve groups of AND circuits (not shown), four AND circuits in each group. The twelve groups of AND circuits 62 are sequentially enabled in a cyclic scanning sequence by respective outputs $ARIC_{1-12}$, of a twelve state Assembly Read in Counter, ARIC (FIG. 7). As will be explained in greater detail in the discussion of FIG. 7, the counter ARIC is stepped only after a non-redundant information byte has been handled through the connecting circuit 62 (i.e. after each pulse $AC_1$ and, conditionally, after odd $AC_{3-17}$). It will therefore be appreciated that when a redundant byte (SC or PC control line set at 1), is addressed by the AC counter the circuit 62 merely marks time in its current position but does not gate the information. Thus, since the twelve groups of outputs of circuit 62 connect to respective ones of the twelve four-stage sub-registers of register 50, only the non-redundant information bytes are placed contiguously in register 50.

In a corresponding manner, 12 AND circuits (not shown) within connecting circuit 64, are controlled by respective ones of the signals $ARIC^1{}_{-12}$ to transfer a signal from an input wire 94 to one of 12 output wires 95. The wires 95 connect to respective inputs of the 12-stage format register 52, the outputs of which are designated $FR_{1-12}$. The signal on wire 94 is determined by circuits 96 to 99 as follows. Inputs to AND circuit 96 are the assembly counter signal $AC_1$ and the complement, $\overline{LD}$ of the LD bit signal. AND circuit 98 is controlled by $AC_3$ and output $\overline{SC_1}$ of inverter 82, and AND-circuit 99 is controlled by $AC_5$ and output $\overline{SC_2}$ of inverter 83. The signals $\overline{SC_1}$, $\overline{SC_2}$, and $\overline{LD}$ remain constant during a substantial portion of each assembly count cycle but are thus respectively sampled only at assembly clock counts $AC_1$, $AC_3$, and $AC_5$. Hence, referring to Table 2, it is clear that a 1 signal will be conditionally transferred to line 94 at $AC_1$, $AC_3$, or $AC_5$, signifying the handling of a 3-bit byte through circuit 60, if, respectively, data has not been lost at time $AC_1$, or if the secondary code bit, $SC_1$ or $SC_2$, is zero at time $AC_3$ or $AC_5$, respectively. Otherwise the signal on line 94 remains zero. Hence the format bit stored in format register 52 will be a one only while a 3-bit byte ($PC_{1-3}$, $PC_{4-6}$, or a synch bit $\overline{LD}$ and $SC_{1,\ 2}$) is coincidentally translated through the connecting circuits 60 and 62.

OUTPUT BUFFERING AND FORMAT COMPRESSION

Figure 6:
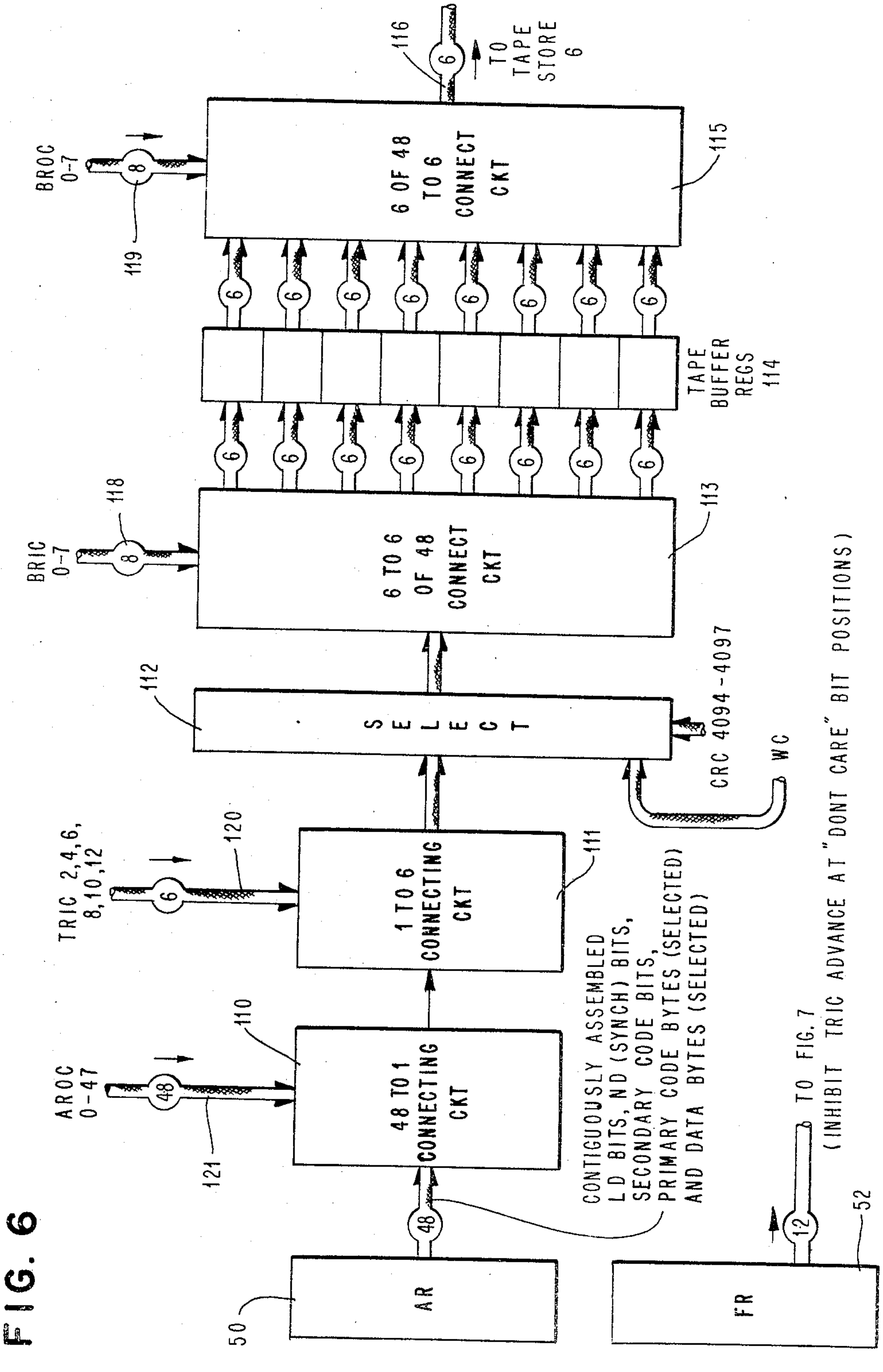
FIG. 6 is a schematic drawing of the circuits coupling the assembling means register output to the tape store in FIG. 1.

Referring to FIG. 6, information flows from the output of assembly register 50, through a 48 to 1 connecting circuit 110, a 1 to 6 connecting circuit 111, a selector circuit 112, and a 6 to 6 out of 48 connecting circuit 113, into one of 8 six-stage output buffer registers indicated generally at 114. Each output buffer register can thus store a 6-bit character to be entered in parallel on 6 respective tracks of the output tape. The outputs of registers 114 feed through a 6 out of 48 to 6 connecting circuit 115 directly into the tape store 6 of FIG. 1, via the 6-line bus 116. The 8-position connecting circuits 113 and 115 are scanned in relatively asynchronous cyclic sequences by cyclic count signals denoted BRIC (for Buffer Read In Count) and BROC (for Buffer Read Out Count) which are carried on respective 8-wire control buses 118 and 119. Connecting circuit 111 is cyclically scanned by six of fifteen count signals TRIC (for Tape Read in Count) applied at 120 and circuit 110 is cyclically scanned by 48 count signals AROC (for Assembly Read Out Count) 0–47, as indicated at 121. As is shown in FIG. 7, and described below, the outputs of the format register 52 are used to control the advance of TRIC, at the "DON'T CARE" scan positions of the connecting circuit 110. In effect, any TRIC pulse which could gate a "DON'T CARE" bit, from assembly register 50 into one of the tape buffer registers 113, is suppressed, and thereby the extraneous bit is deleted from the output stream. It should be noted with reference to the discussions of Table 2 and FIG. 5, above, that such extraneous bits coincide with those conditionally placed in the assembly register 50 at AC counts $AC_1$, $AC_3$, and $AC_5$.

Accordingly, the circuits 110, 111, and 113, are required to operate to sequentially scan the contents of assembly register 50, one bit at a time into consecutive stages of the tape buffer register 114, while conditionally skipping over extraneous bits under the control of the format register outputs.

TIMING CONTROLS

Referring to FIGS. 7A and 7B, all of the foregoing operations are controlled and coordinated in the following manner. FIGS. 7A, B, comprise a more detailed schematic drawing of the system generally shown in FIG. 1. In this figure the previously described encoding means 3, assembly means 4, output data buffering apparatus 5, and tape store 6, are shown as general blocks, but the input data buffer 2 and the coordinating controls 7 referenced in FIG. 1, are shown in somewhat greater detail.

The input buffer 2 includes a 26 to 26 out of 156 connecting circuit 141, six 26-stage input buffer registers 142, and a 26 out of 156 to 26 connecting circuit 143. Information in 26-bit groups is taken from the 24-line source data bus 144, LD (Lost Data) input line 145 and ND (No Data) line 146, and transferred in sequence into the 26-stage input buffer registers 142, by the connecting circuit 141. Circuit 141 is controlled by six mutually exclusive read-in count signals $RIC_{1-6}$. Information in the buffer registers is transferred in a cyclic sequence to the 26-line output bus 15, via the connecting circuits 143, which are controlled by six read-out count signals $ROC_{1-6}$. Further, as explained above in the discussion of FIGS. 2 to 6, the data is encoded by encoding means 3 (FIG. 2), assembled by assembling means 4 (FIG. 5) which selectively discards 3-bit primary code bytes and 4-bit data bytes under the control of the secondary and primary control codes, and transferred in six-bit units, subject to a selective deletion (format compression) of "DON'T CARE" bits, through the output data buffers shown at 113 in FIG. 6, into the tape store 6.

Timing controls which control the selection and transfer of data from the 26-wire input bus (144–146) to the six-wire output bus (150), in relatively asynchronous cycles, include the read-in counter (RIC) 151, the read-out counter (ROC) 152, the assembly counter (AC) 153, the assembly read-in counter (ARIC) 154, the assembly read-out counter (AROC) 155, the tape read-in counter (TRIC) 156, the buffer read-in counter (BRIC) 157, and the buffer read-out counter (BROC) 158. In addition, a character counter 159 and a word counter 160 control the organization of the compacted tape records into blocks of 4,098 six bit characters, the last three of which denote the number of uncompressed words corresponding to the first 4,088 six bit characters of the compressed block. Thus, upon reconstruction of any block a convenient check on the validity of the reconstructed data may be had by comparing the recorded word count (character 4096 to 4098) to the actual number of reconstructed words obtained.

The three pairs of conditionally stepped clock counters RIC and ROC, ARIC and AROC, and BRIC and BROC, perform opposite functions on the information flowing through the circuits 2 to 5. That is, the conditionally stepped 6-stage counters RIC and ROC, respectively, control the entry of information into and removal of information from the six 26-stage input buffer registers 142; the 12-stage counter ARIC and the 48-stage counter AROC, respectively control the entry of information into and the removal of information from the assembly register 50 as shown in FIGS. 5 and 6, and the 8-stage counters BRIC and BROC control the entry of information and the removal of information from the eight 6-stage tape buffer registers 114 shown in FIG. 6. Since these pairs of counters are not relatively synchronous, special action is required whenever one overtakes the other, in order to preserve the sequence of information in the output stream and thereby to maintain the reconstructability of the compressed information. Thus, for each pair of counters there is provided "race" monitoring circuits which detect the imminence of, and act to prevent, overtake conditions. For the pair of counters RIC and ROC the corresponding "race" monitor comprises the two AND-circuits 170 and 171. For ARIC and AROC the corresponding monitor is denoted 172, and for the pair BRIC and BROC the corresponding "race" monitor is denoted 173.

The counters AC, ARIC, AROC, and TRIC are adapted to conditionally count the 2 megacycle common clock pulses CC appearing on bus 175. Phase splitters 176 and 177 each split the clock pulses CC into odd and even phased pulses, so that counters AC and TRIC step at a maximum rate of 4 megacycles, while counters ARIC and AROC step at maximum rates of 2 megacycles each. Counter BRIC advances one step for each cycle of counter TRIC, provided that no END OF RECORD (EOR) is issuing from the tape store. Thus, at each step $TRIC_{13}$ of counter TRIC, AND circuit 178 is conditioned by $\overline{EOR}$ and $TRIC_{13}$ to operate BRIC. Similarly, counter ROC operates once for each cycle of counter AC via AND circuit 179 connected between $AC_{20}$ and the step input of ROC. Circuit 179 operates only if a NO DATA signal is not present on line 180. Word counter 160 advances once for each cycle of AC (at $AC_1$ time), and counter RIC advances conditionally in response to clock pulses issued by the data source 1 (FIG. 1) and delayed by delay units 182 and 183, when AND circuit 184 is enabled by the absence of an output from OR circuit 185. Finally, counter BROC and character counter 149 (CRC) are stepped in response to tape timing pulses TC which are issued by store 6, on line 187, in synchronism with the storage of six-bit characters on tape.

Beginning at the input end, the control of the flow of signals from bus lines 144–146 to bus 15 is effected as follows. At the start of any record counters RIC and ROC are set to states $RIC_1$ and $ROC_1$, respectively, thereby permitting connection of lines 144–146 to the inputs of a first 26-stage register in block 142 and lines 15 to the outputs of the same register. The output connections are completed unconditionally, and the input data connections are completed only when a clock pulse from the data source is passed through AND circuit 190 to connecting circuit 141. Inhibitory control over AND circuit 190 is exerted by a FULL output from AND circuit 170. AND circuit 170 is connected to the outputs of the ND bit (TAG bit) storing stages of all of the registers 142. When these stages simultaneously contain "0" tag bits, a FULL signal issues from AND circuit 170. When the same stages simultaneously hold "1" tag bits, an EMPTY signal issues from AND circuit 171. Tag bits of "0" are entered whenever source data is passed from lines 144 through connecting circuit 141, and tag bits of "1" are entered at $AC_{19}$, just prior to changes in state of counter ROC.

Thus, so long as a FULL condition is absent circuits 141 are operated by the source clock to transfer data from bus 144 into appropriate stages of registers 142 selected in accordance with the state of counter $RIC_1$ and as counter AC is cycled the registers 142 are emptied in sequence.

LD bits are unconditionally set by the source clock delayed through delay 182 so that even if a data transfer is inhibited by the presence of a FULL condition, an LD bit is set into one of the registers 142 selected in accordance with the state of counter RIC. The LD bit thus set will be 1 or 0 depending on whether or not the output of AND circuit 170 indicates FULL, since the LD bit input is directly connected to the FULL output. The effect of a FULL output is delayed in passage from AND circuit 170 to OR circuit 185 by interposition of delay 191 so that inhibitory control by a FULL signal over RIC input gate 184 is delayed until after the clock pulse, which entered the corresponding LD bit of 1, has stepped RIC. Thus, RIC steps until registers 142 are all occupied and comes to rest at the state corresponding to the position of the next register to be filled.

In like fashion ROC advances one step at each $AC_{20}$ pulse until all six tag stages in register 142 are simultaneously set at 0 (empty). When that occurs a flip-flop 193 is set to indicate NO DATA. Flip-flop 193 is reset by an $AC_{21}$ signal if the setting output of AND circuit 171 has changed. Accordingly, ROC counts until no data is available in registers 142, then comes to rest pointing to the next register to be filled with data, and conditionally resumes counting when counter AC, which as will be shown below, is subject under some circumstances to inhibitory control by a NO DATA signal, resumes counting. In effect, therefore, whenever counters RIC and ROC are in corresponding states ($RIC_j = ROC_j$) either the RIC or the ROC count is discontinued depending upon whether registers 142 are at that time all full or all empty, respectively.

Advancing to encoding means 3 (refer to both FIG. 2 and FIG. 7), data outputs on bus 15 are held constant from $AC_{19}$ of one AC cycle to $AC_{18}$ of the next cycle and control code outputs on 8-line bus 195 are held constant from $AC_{17}$ of one AC cycle to $AC_{16}$ of the next cycle. Signal $AC_{16}$ is conditionally passed through AND circuit 196 (FIG. 2) to reset primary code buffer register 33 (FIG. 2) and $AC_{17}$ is conditionally passed through AND circuit 197 to transfer a new primary code from bus 32 (FIG. 2) into register 33. $AC_{18}$ is conditionally passed through AND circuit 198 (FIG. 2) to reset buffer register 17 and $AC_{19}$ is conditionally passed through AND circuit 199 to set new data in register 17. AND circuits 196–199 are all subject to inhibitory control by a NO DATA output from flip-flop 193. Hence, towards the end ($AC_{16, 17}$) of an AC count cycle, the current primary code is stored in register 33 as the old primary code and then, at $AC_{19, 20}$, the old data corresponding to the newly stored primary code is entered in register 17, provided that flip-flop 193 is not signalling NO DATA; i.e. provided that not all of the registers 142 are then empty. It follows that if a NO DATA output is present prior to $AC_{16}$ of any AC count cycle (hence, prior to $AC_1$ of the same cycle since tag reset occurs at $AC_{19}$) registers 33 and 17 will retain their respective contents for another AC cycle. Under the same conditions, however, ROC will not be advanced at $AC_{20}$ and therefore the data on bus 15 will remain invariant for another AC cycle. Thus, the primary code output for the next AC cycle will be 111111. Also, in response to an ND bit of 1, the secondary code output will be set to 11, by means not shown, for the following AC cycle. At $AC_{19}$ the LD and ND (tag) bits in the last addressed one of registers 142 are both set to 1. Thus, for any AC cycle during which a NO DATA signal is present the LD, ND, SC, and PC inputs, to assembly means 4, are all 1's. This being the case it is easily verified that only gates 71 (FIG. 5) in connecting circuit 60 (FIG. 5) of assembly means 4, will be energized during the subsequent AC cycle (specifically at $AC_1$ time) whereby at $AC_1$ time lines 61 will all carry 1's and at the other AC phases the outputs at 61 will be 0. As may be inferred from the inputs to AND circuit 200 (FIG. 7), ARIC is conditionally stepped by the pulses which advance AC to even-numbered states, depending upon the values of specific SC and PC bits at certain of the odd-numbered states of AC; particularly odd states $AC_3$ to $AC_{17}$ (or briefly states $AC_{2j+1}$; $j=1$ to 8). At any of the latter states, for example, state $AC_{2k+1}$ ($k$=any integer from 1 to 8), ARIC is advanced by "STEP AC EVEN" only if the corresponding $SC_k$ (if $k$ is less than 3) or $PC_k$ (if $k$ is greater than 2) is not set at 1. As noted above, however, under NO DATA conditions all SC and PC bits are fixed at 1 for the entire subsequent AC cycle. Hence, under such conditions ARIC will step only once, at the end of $AC_1$ time, and remain quiescent throughout $AC_2$ to $AC_{18}$. At $AC_{19}$ ARIC is turned OFF and at $AC_1$ it is turned on again. Thus ARIC cannot advance in the interval from $AC_{18}$ to $AC_1$ of the following AC cycle, and therefore under NO DATA conditions ARIC will step just once (at the end of $AC_1$) in a complete AC cycle. In view of this, connecting circuit 62 (FIG. 5) will transfer the 1111 output of gates 71 at time $AC_1$ into one 4-stage sub-register of register 50, and then remain connected to the next consecutive sub-register for the remainder of the AC cycle while 0 outputs are delivered from gates 72 to 75. In effect, therefore, a 1111 "NO DATA byte" is gated into register 50 by circuits 60 (FIG. 5) and the latter circuits advance one position to connect to the next byte sub-register in register 50.

Since ARIC is turned ON of $AC_1$ and OFF by $AC_{19}$ (FIG. 7) the timing of ARIC is, in effect, coordinated with the timing of AC. Since ROC is also conditionally controlled by $AC_{20}$, it follows, and will be elaborated upon below, that the control of AC is critical to the efficient operation of the input buffers, the encoding means and the assembling means. It will be shown that when the ROC count overtakes the RIC count (NO DATA) the AC count is permitted to advance (AC ON) despite the absence of input data, but only if both the assembly register 50 (FIG. 5) and the output buffers 114 (FIG. 6) are about to become depleted. Thus, NO DATA bytes are passed through register 50 and output buffers 114 to the output tape only when absolutely necessary and not merely when the input buffers 142 (FIG. 7) first become empty. It will also be shown that if the ROC count has not overtaken the RIC count (i.e. if some of the input buffers 142 still contain unprocessed information) AC is not permitted to advance unless the difference (modulo 12) between the ARIC count and one-fourth of the AROC count has closed to a predetermined figure (specifically 3). Because of this, ARIC can not lead AROC by more or less than 12 bit places with respect to the assembly register 50, without corrective action being taken by the AC counter.

The counter AC is turned ON by an output from AND circuit 210. AND circuit 210 is controlled by the output $Fc$, of LOW DATA flip-flop 172, and the output of OR circuit 211, $Fc$ is turned on by an output from OR circuit 212 and OFF by the 2nd step output of a 4-step counter 213, which is conditioned to count ARIC step pulses when AND circuit 214 is enabled. AND circuit 214 is enabled by the absence of a GENERAL RESET signal when AC is ON. A GENERAL RESET signal occurs when OR circuit 215 is excited by either the 4097th state output of the character counter 159 or by a start of Record signal (SOR) from tape store 6. OR circuit 212 is excited by either a GENERAL RESET signal or by a signal represented by the Boolean expression: $ARIC_3 \times AROC_0 + ARIC_4 \times AROC_4 + \ldots + ARIC_{j+3} \times AROC_{4j} + \ldots + ARIC_{12} \times AROC_{26} + ARIC_1 \times AROC_{40} + ARIC_2 \times AROC_{44}$. Recalling that ARIC moves four steps at a time in relation to the assembly register 50 (i.e. $ARIC_j$ addresses assembly Register bit places $4_j$–4 to $4_j$–1) and AROC moves one step at a time ($AROC_j$ addressing assembly register bit place $j$) the above indicates that when AROC is lagging exactly 8 bit places behind ARIC, or when a GENERAL RESET occurs, a LOW DATA condition ($Fc$) will be set, and will persist for 2 ARIC count steps (or 2 such steps after termination of GENERAL RESET).

OR circuit 211 is excited by $\overline{\text{NO}}$ $\overline{\text{DATA}}$ (not NO DATA) or the output $Fb$ of logic *ckt* 173 which indicates that BROC is threatening to overtake BRIC. Thus, when data is available in input buffers 143 $\overline{\text{NO}}$ $\overline{\text{DATA}}$ or when data is running low ($Fb$) in the output buffers 114 (FIG. 6), and a supply of data to the assembly register 50 is called for ($Fc$), AC is turned ON and sequences.

AC is turned OFF by an output from OR circuit 220 which responds to an output from either of two AND circuits 221 or 222. AND circuit 221 is excited by $\overline{Fc}$ (not LOW DATA) and $AC_{20}$, while AND circuit 222 responds to $AC_{21}$ and a signal which persists for the duration of output character counts, CRC 4088 to CRC 4094, of counter 159. Thus, AC is turned OFF towards the end of its cycle ($AC_{20}$ or $AC_{21}$) if either ARIC has advanced two counts ($\overline{Fc}$) since the setting of LOW DATA ($Fc$) or storage of a tape block is nearing completion (CRC4088–4094). Essentially, therefore, AC sequences only when a supply of data is needed in the assembly and output buffer registers.

Since ARIC turns OFF at $AC_{18}$ and ON at $AC_{22}$ it too sequences only under the conditions specified for AC and further only in response to outputs from AND circuit 200. The latter are produced only in response to the STEP AC EVEN pulses, which advance AC from odd-numbered to even-numbered states, provided, however, that if the state of AC is an odd-numbered state from 3 to 17 a corresponding control bit $SC_{1,2}$, $PC_{1-6}$ is 0. Thus, referring back to FIG. 5 whenever one of the groups of gates 72–75 fails to respond to the associated odd-numbered AC pulse, ARIC will fail to sequence and therefore gated data bytes will be entered only in consecutive sub-registers of register 50.

Considering next the emptying of register 50, as controlled by AROC, AROC is turned ON only when AND circuit 225 is energized. This occurs only when TRIC is OFF and BRIC is not overtaking BROC ($\overline{Fa}$), and the output of logic circuit 226 is excited. Circuit 226 responds to the signals AC OFF, $\overline{Fc}$, $Fb$, $\overline{\text{NO}}$ $\overline{\text{DATA}}$, and COUNT 2ND ARIC STEP, according to the following Boolean function: (AC OFF+$\overline{Fc}$+COUNT 2ND ARIC STEP)×(AC OFF+$Fb$+$\overline{\text{NO}}$ $\overline{\text{DATA}}$). Thus, for example, circuit 225 produces a high output when AC is OFF, or when AC is ON and input data is available ($\overline{\text{NO}}$ $\overline{\text{DATA}}$) in the input buffers, or when data is available in the assembly register ($\overline{Fc}$) and BROC is overtaking BRIC ($Fb$), and so forth. Thus AROC sequences only in response to an indication ($\overline{Fa}$) that a supply of data can be accepted by the output buffers while coincidentally other indications are given that data can be so supplied and is in fact needed.

AROC is turned OFF by the output of OR circuit 227 (GENERAL RESET or TRIC 12). Thus, AROC turns off towards the end of each TRIC cycle and during the reset accompanying the start of each new record or record block.

Finally, TRIC is set ON by $AROC_{ON}$ and OFF by OR circuit 228 which responds to the output, $AROC_{OFF} \times TRIC_{14'}$ of AND circuit 229, or GENERAL RESET. Thus, in effect TRIC follows AROC in turning ON and OFF. In addition, TRIC is advanced to even and odd states by outputs of phase splitter 177 gated through respective AND gates 230 and 231. These gates are controlled in common by: $FR_1 \times AROC_0 + FR_2 \times AROC_4 + \ldots + FR_{j+1} \times AROC_{4j} + \ldots + FR_{12} \times AROC_{44}$, which means that TRIC is prevented from sequencing when a format indication in register 52 (FIG. 5) is set to indicate a 3-bit byte in register 50 the first (DON'T CARE) bit of which is then being addressed by AROC. Hence, the extraneous or DON'T CARE bits are eliminated.

To consolidate and summarize the foregoing, consider, by way of example, the recording of a block of 4088 compressed 6-bit characters; particularly, the first block of a multi-block record. As the tape reaches recording speed, a START OF RECORD (SOR) signal is given. This, by means not shown, enables the data source to start its delivery of source clock and data signals, and also produce a GENERAL RESET via OR circuit 215. The GENERAL RESET resets the assembly register to all zeroes, the AC counter to state $AC_{22}$, the RIC and ROC counters to $RIC_1$, and $ROC_1$, respectively, the ARIC counter to $ARIC_1$, the AROC counter to $AROC_0$, the BRIC and BROC counters to $BRIC_0$ and $BROC_0$, respectively, the word counter to state 0, and the character counter to $CRC_1$.

At this point the tape store issues five preliminary timing pulses TCA which, via OR circuit 235, step BROC and thereby delivers five 0 characters to the tape. Ordinarily, with each six-bit character stored on the tape a seventh even parity bit is stored on a seventh track, so that ordinarily a zero character is stored with a 1 parity bit. However, the five characters sampled by TCA are stored with 0 parity and therefore appear as a blank interval on the tape. The effect of this, therefore, is to move BROC 5 places ahead of BRIC. IF BROC leads BRIC by only 1 or 2 counts logic 173 issues F*a* (BRIC approaching BROC) and if BROC is situated so that it approaches BRIC from behind by two or three counts (BROC approaches BRIC) F*b* occurs. Thus, with BROC at $BROC_5$ and BRIC at $BRIC_0$, F*b* is set ON.

With the GENERAL RESET accompanying SOR, latch 172 is set to F*c* (LOW DATA) permitting AC and ARIC to sequence for at least two ARIC steps. If the input buffers are all empty (NO DATA) due to an absence of source data and clock signals AC is turned on by F*b* (BROC having approached BRIC) and F*c*, and cycles twice to store two NO DATA bytes (1111) whereupon latch 172 turns off (F*c*). But then ARIC having advanced two byte counts it leads AROC by exactly eight assembly register bit places and latch 172 therefore immediately turns ON again. Thus, AC remains ON and continues to sequence for at least two more ARIC counts.

If data is available in the input buffers soon after SOR ($\overline{\text{NO DATA}}$) the same sequencing of AC for at least four ARIC counts will take place, but this time ARIC will advance conditionally on each odd AC step from $AC_3$ to $AC_{17}$ so that at least four of the seven bytes of the first encoded input word will be entered into the assembly register. While this is taking place, AROC begins to run as soon as the 2nd ARIC step is counted and therefore ARIC and AROC keep in step to maintain an ARIC lead of 8 bits, and thereby to continue F*c*.

This process continues with AC, ARIC, AROC, TRIC and BRIC, conditionally sequencing to maintain a supply of meaningful information characters in the output buffers. Whenever the input buffers are all full (LOST DATA) an LD bit of 1 is set in the last addressed input buffer together with an ND bit of 0, whereby the combination, 10, indicates a loss of data following the output word in which it occurs. If data has not been lost and the buffers are not all empty LD and ND are both set to 0 and in handling the resultant combination 0, 0, $SC_1$, $SC_2$ the format controls act to delete the first 0. If all input buffers are empty and AC is sequenced, LD, ND, $SC_1$, and $SC_2$, are all set to 1, and $PC_{1-6}$ are 1 by virtue of the inhibition of the encoder register resets at $AC_{16}$–$AC_{19}$, so that distinctive NO DATA bytes (1111) are forwarded to the output buffers.

When the 4088th 6-bit character of the block is entered on the tape and AC has completed its then current cycle, gates 220 and 222 act to turn off AC and ARIC is set to $ARIC_1$, AROC to $AROC_0$, and assembly register 50 is reset to 0, all by means not shown.

Because of this a series of "zero" characters is delivered to the tape output buffers by AROC until character count 4095 is registered. Then between character counts 4094 and 4097 the word count in counter 160 is scanned into connecting circuits 113 (FIG. 6) by the selecting circuits 112. The latter comprise six OR circuits which superimpose the word count bits directly over the zero bits then issuing from the reset assembly register, with word count bit selection controlled through means not shown, by the AROC timing outputs.

With AC OFF, AROC and TRIC are kept cycling until BRIC approaches BROC (F*a*), and thereafter AROC maintains BRIC two steps behind BROC so that the word count information scanned from CRC4094 to 4097 is entered on tape during the last three character counts 4095 to 4098.

At CRC4098 (CRC4097+) GENERAL RESET establishes the conditions specified above for SOR and the recording of a new block is commenced.

It is especially noteworthy that the timing system just described will function for many different source and storage rates, despite the restrictions placed on the various counters. For example, 729 tape units can record at rates of 20,000 to 90,000 characters per second, and data sources (computers) of the type contemplated for the particular application shown in FIG. 7 can be expected to produce program address information (input data words) at intervals as small as 250 nanoseconds (¼ microsecond) and as large as 1 millisecond depending on the conditions of program usage. And yet the system of FIG. 7 will ignore bursts which exceed the cycling rate of AC, by lost data control, as well as input conditions which lead to emptying of all of the input buffers (NO DATA). AC steps conditionally in response to the outputs of phase splitter 176, at a maximum rate of 4 million steps per second or $4/22$ million AC cycles per second (or approximately 182,000 cycles per second). Thus AC can pass a maximum of 182,000 24-bit input words per second through encoder 3. Maximum efficiency is achieved when AC is kept operating at maximum speed. This can only be done if the tape is recording the equivalent of 182,000 input words per second, while the source is delivering at least 182,000 words per second. With a tape operating at a maximum rate of 90,000 characters per second with an average output to input bit compression ratio of three to one, which is quite likely, the tape would be recording the equivalent of $18 \times 90{,}000$ input bits per second or $$18/24 \times 90{,}000 = 67{,}500$$

input words per second. Thus AC could be operated at one third of its rate capacity, on the average, delivering at least three times as much information to the tape as would be recorded without compression, while ignoring input data which it cannot handle due to rate limitations.

Tape recording units are at present available which can record 170,000 eight bit characters per second or $8/6 \times 170{,}000$ (=approximately 226,000) six-bit characters per second. Thus, for special applications such tape units could assimilate the equivalent of approximately $18/24 \times 226{,}000$ (=169,500) twenty-four bit input words per second, and thereby operate AC at close to the peak rate when the source word supply rate is sufficient.

In any event, however, the system of FIG. 7 can interface between almost any serial storage unit presently available for use and any data source having a maximum bit rate in excess of the storage unit bit rate and it will produce a real-time record having at least twice as much information content as would be present on a record produced without compression. Even more significant, perhaps, it has been noted that the particular compression scheme above, in which the primary code is further compressed by means of secondary encoding, distinctively increases the output to equivalent input bit ratio over that resulting when only a primary code is used.

Those skilled in the data handling arts having once appreciated the need for, and purpose of, the above coordinating controls may readily devise other equivalent schemes for a synchronously processing data between source (computer) buffers and destination (tape) buffers. Important factors affecting the performance and effectiveness of the particular arrangement described above are the frequency of the common clock oscillator (CC)—this should be greater than the basic character (6-bit) writing rate of the tape store (e.g. at least ten times the character rate)—and the average data output of the source 1, which should also be greater than the tape writing rate by a factor related to the average bit reduction ratio expected of the instant reducing system.

As previously stated, the compacted information is preferably placed on the tape in fixed length blocks of 6-bit parallel "characters"; a convenient block length being 4098 such "characters." This simplifies the recovery or retrieval process by means of which undiscarded data words are reconstructed, and also insures that no more than 4098 "characters" of compacted information will be lost in the event that information in the block is obliterated.

In the extreme best case, i.e. all zero input data words, it would be possible to record in blocks, the equivalent of 196,176 input data bits, or 8,174 twenty-four bit input data words by means of $6\times 4098=24,588$ output bits, according to the following encoding schedule:

First encoding (AC) cycle bit assembly—9 bits consisting of a "0" synch bit, two 0 SC bits and six 1 PC bits. Then 8173 encoding cycles, each yielding—3 bits consisting of a 0 synch bit and two 1 SC bits. Then ten "zero" and word count characters, for a total of $9+3\times 8173+10\times 6=24,588$ total output bits. This assumes no "LOST DATA" bits are required to be inserted into the compressed stream.

As shown in FIG. 8A, the recovery (decompression) procedure starts with a subroutine 300 for initializing the states of all memory cells. This includes the fetching of a first compacted block from a file of blocks on a tape and the loading of the first 36-bits of said block into a word buffer. At 301, all operating registers are initialized for reconstructing a new 24-bit data word. At 302, a first bit is "fetched" by means of the bit fetching subroutine shown in FIG. 8B. At 303, this bit is tested to determine if it is a 1 or a 0 (synch bit). If it is a 1, a second bit is "fetched" in 304. If this second bit is found to be a 1 at 305, then a potential no data condition (1111) exists. This condition is tested by "fetching" the next two bits in 306 and testing for the combination 11 in 307. If 11 is detected, the program returned to 301. Any other combination 01, 00, or 10, indicates an error in the original encoding process and the recovery process is stopped at 308. Thus another error check, in addition to the block word count, is inherent in the recovery process.

Referring again to step 305, if the second bit is not a 1, then it is the 0 synch bit following a 1 lost data bit. A lost data bit indicator is then set to 1 and the program returns to the same operation 210 which would follow detection of a "0" synch bit as the first bit of a 24-bit string. At 310, the next two bits (i.e. the secondary code bits) are "fetched," and at 311 the first of these ($SC_1$) is tested to determine if it is a 1. If it is not, control is passed to opertaion 312 and three more bits are "fetched." At 313, these three bits are entered in place of the previously decoded and stored primary code bits, $PC_{1-3}$, and control is passed to 314. At 314, the second bit ($SC_2$) fetched by operation 310 is tested to determine if it is a 1. If not, three more bits ($PS_{4-6}$) are "fetched" at 315. Then at 316, these three bits are substituted for the previously recovered primary code bits, $PC_{4-6}$.

At 317, the byte counting variable $t$ (which ranges from 1 to at least 7) is set initially to 1 and at 318 primary code bit $PC_t$ ($t=1$) is tested. If the bit is 0, then four data bits are "fetched" at 319. In 320, these four bits replace the previously recovered first data byte. In 321, the byte counting variable $t$ is increased by 1 and in 322 it is tested to determine if it is greater than 6. If not, control is returned to 318 for further processing of the correspondingly numbered primary code bits. If $t$ is greater than 6, control passes to operation 323 at which point the reassembled 24 bit data string or word and the antecedent lost data indicator, if any, are stored in an output buffer. The output word counting variable $q$ is incremented by 1 at 324 and control is returned to 301 after performance of an intermediate count-checking procedure which is described below.

The "bit fetching" subroutine, as performed on an IBM-7090 Processor, is illustrated in FIG. 8B. At 400, a signal is received in connection with one of the operating steps 302, 304, 306, 310, 312, 315, or 319 in FIG. 8A, indicating that $n$ consecutive bits of compacted code are to be "fetched" ($n$ being either 1, 2, 3, or 4), and a 7090 bit counting variable $j$ is incremented by $n$. The incremented variable ($j+n$) is tested at 401 to determine if it is greater than 36, since a 7090 word consists of 36 bits. If $j$ is greater than 36, a 7090 word counting variable $i$ is incremented by 1 at 402 and tested at 403 to determine if it is greater than 683, which is the number of 36-bit 7090 word units in a block of 4098 6-bit tape characters. If $j$ is greater than 36 and $i$ is not greater than 683, $j$ is decreased by 36 (at 404) and at 405, the next 36-bit 7090 word is fetched and stored in a connected sequence in the 7090 word buffer adjacent the unprocessed bits of the previous word.

If $i$ is greater than 683, this indicates that all $q$ input words in a compacted record block have been processed. Hence, at 406, the $q$ reassembled data words are transferred as a block unit to tape storage, and at 407 a new input record block is "fetched" from tape. In 408 counting variables $i$ and $j$ are reset to 1 and at 409 a test is made for an end of file signal on the input tape. If not, control is passed to 405. If, however, a "yes" response is obtained at 409, an END-OF-JOB signal is produced at 410.

At 411, which follows after either step 401 ($j$ less than or equal to 36) or step 405 (36 new bits chained to remaining unprocessed bits) $n$ consecutive bits are transferred for further handling in accordance with the procedure of FIG. 8A (main program) and control is returned to the main program.

To summarize, 24-bit data words are reconstructed from the compacted information by a series of selective bit-fetching, bit-testing, byte substituting, and count updating operations. At the start of each word reconstruction, bits are fetched and tested for no data and lost data conditions. If data is present, then two 3-bit primary code bytes are selectively reconstructed in accordance with the values of the two secondary code bits, and the six 4-bit data code bytes are selectively reconstructed into 24-bit data words in accordance with the six corresponding primary code bits.

As each data byte is reconstructed, a byte count $t$ is incremented by 1 and as each data word is reconstructed, a reconstructed data word count $q$ is incremented by 1.

As part of the reconstruction process, it is necessary to repeatedly and selectively fetch a variable number $n$ of consecutive bits ($n=1$, 2, 3 or 4) from the unreconstructed (compacted) block, and to place the fetched bits in appropriate positions within the word being reconstructed. To implement this on the 7090 Processor, it was found expedient to treat each unreconstructed block of 4090 6-bit characters as a series of 683 unreconstructed 36-bit words, and to update an unreconstructed bit count $j$ and an unreconstructed word count $i$ as the unreconstructed bits are processed. When the bit count $j$ exceeds 36, it is decreased by 36 and the unprocessed bits of the then current word, and the 36 bits of the next word in the sequence of 683 words are concatenated. In this manner a continuous supply of compacted bits is maintained.

Within the main program (FIG. 8A) after the reconstructed word count $q$ is increased by 1 the unreconstructed word count $i$ is checked at 420 to determine whether the 683rd 36-bit 7090 word is being processed. If not, control passes to the initial step 301, whereas if a "yes" response is obtained, the unreconstructed bit count $j$ is tested at 421 to determine if it is greater than 22, which would indicate that the last three characters of a tape block were being handled. If $j$ is not greater than 22, control passes again to 301. But if $j$ is greater than 22, the reconstructed word count $q$ is compared at 422 to a portion of the 683rd unreconstructed word, specifically, to the last 13 bits of that word. These bits have been prearranged by means 112 of FIG. 6 to represent the expected number of reconstructed 24-bit data words in the block under consideration. If a disagreement is indicated control passes to the error stop operation at 308. However, if agreement is indicated $j$ is set to value greater than 36 and control passes to 301 so that upon execution of the next bit-fetching sub-routine (FIG. 8B) the sequence 400, 401, 402, 403, 406, 407 and 408 will be followed whereby the appropriate initial values of $i$ and $j$ will be set and the next record will be secured.

It is emphasized that the foregoing generalized program is presented merely as an example to indicate the reversibility (i.e. utility) of the data reduction effect produced by the special purpose apparatus shown in FIGS. 1 to 7.

It is especially noteworthy that the reverse processes performed by the special apparatus and the general program are not simply opposites of each other. The apparatus is subject to asynchronous timing restrictions which do not affect the program. The program is capable of processing all of the information on the tape, whereas the apparatus is forced, on occasion, to discard one or more words of information in order to coordinate its input and output data flows.

Those skilled in the art will readily implement the details of the recovery program generally described above. Of necessity, however, lost data words indicated by LOST DATA bits can be recovered only by a guessword procedure based on knowledge of a predetermined relationship between the reconstructed data and the lost data.

While the invention has been particularly shown and described with reference to a preferred embodiment thereof, it will be understood by those skilled in the art that the foregoing and other changes in form and details may be made therein without departing from the true spirit and scope of the invention.

What is claimed is:

1. Apparatus for reducing multi-word blocks of randomly timed data word signals and for conveying the reduced signals for further handling at a predetermined rate and in a bit contiguous form comprising:

means for sequentially receiving randomly occurring data word signals, each word including a plurality of bits;

means responsive to said received word signals for deriving positionally encoded control code signals having positioned bits which individually represent comparative identity and lack of identity between correspondingly positioned groups of bits of the respective received word and a previously received word;

means coupled to said receiving means and deriving means for selecting from said positioned groups of said received words only groups which are represented by respective said control signal bits as lacking identity and from said control signals at least one control bit signal; and means coupled to said selecting means, for assembling said selected groups and control signals into a contiguous signal form, and for conveying said assembled signals at a predetermined bit rate.

2. Apparatus according to claim 1 which is particularly effective when input signals received by the receiving means have an average bit recurrence rate exceeding the said predetermined bit rate of the conveying means.

3. Apparatus for reducing multi-word blocks of randomly timed data word signals and for transferring the reduced signals in real time of occurrence at a predetermined bit transfer rate and in a bit contiguous form comprising:

a source of a block plurality of randomly occurring data word signals, each word including a plurality of bit signals;

limited capacity buffer storage means for temporarily storing at least one word of bits but less than a block of bits;

status indicating means coupled to the buffer storage means for indicating full and empty status conditions of said buffer storage means;

means coupled between said source and buffer storage means and conditioned by absence of full indication from said status indicating means to transfer data word signals at times of issuance from said source into said buffer storage means for storage in available storage sections of the buffer storage means;

means connected to said status indicating means for producing supplemental word tag signals; said tag signals representing data transfer continuity status for data words successively stored in said buffer storage means including states representing continuity between consecutively stored words, LOST DATA and NO DATA;

means coupled to said buffer storage means for producing for each word a plural bit supplemental control code having bits individually representing identity and lack of identity between correspondingly positioned groups of bits in the respective and preceding data words;

means coupled to said buffer storage means, said tag producing means and said control code producing means for selecting groups of bits in said data words, according to conditions of respective said control codes, together with said tag signals and at least one of said control signals;

a source of timing signals having a predetermined rate of occurrence; and means coupled to said selecting means and timing signal source for transferring the output of said selecting means in a bit contiguous form at a predetermined rate releated to said timing signal rate of occurrence.

4. Apparatus for reversibly reducing sequences of data signals on a real time basis comprising:

means for sequentially handling said data signals in predetermined word units each including a predetermined plurality of byte units, each byte unit including a predetermined plurality of bits;

means coupled to said handling means for deriving a primary control code having a bit therein corresponding to each said data byte, each primary code bit denoting the redundancy of the corresponding byte in relation to the correspondingly ordered byte of the preceding word;

means coupled to said primary code deriving means for handling said primary code bits in predetermined byte units;

means coupled to said primary code byte handling means for deriving a secondary control code bit for each primary code byte, said secondary code bits denoting the redundancy of the corresponding primary code byte in relation to the corresponding primary code byte of the preceding data word; and means coupled to said handling means and to said primary and secondary code deriving means for assembling the non-redundant primary code and data bytes, together with the associated secondary code bits, into reversibly reduced trains of contiguous equal duration bit signals.

5. Apparatus for reversibly reducing sequences of data signals on a real time basis comprising:

means for sequentially handling incoming data signals in word units of predetermined length recurring at a first variable rate, each word unit including a predetermined plurality of byte units, each byte unit including a predetermined plurality of bits;

a first register having the capacity to store a word unit of data;

first transfer means for sequentially transferring data words from said handling means into said first register at a second variable rate different from said first rate;

first comparing means coupled to said first register for comparing each byte of data transferred into said register with the corresponding byte previously held in said register;

a second register having the capacity to store one bit of information for each byte in a word unit of data;

second transfer means coupled to said first comparing means for transferring primary code bits of information into said second register at said second variable rate in accordance with the byte comparison outputs of said first comparing means;

second comparing means coupled to said second register for comparing the primary code inputs thereto with the previous contents thereof, in byte units; and means coupled to the said first and second transfer means and to said second comparing means for assembling selected primary code and data bytes, together with secondary code bits corresponding to the output of said second comparing means, into contiguously positioned and reversibly reduced composite output trains of equal duration bit signals occurring near in time to associated input bits of said input word units.

6. Apparatus for reversibly reducing sequences of data signals on a real time basis comprising:

means for sequentially handling data signals in word units of predetermined length, each word unit including a predetermined plurality of byte units, each byte unit including a predetermined plurality of bits;

a first register having the capacity to store a word unit of data;

means for sequentially transferring said data words from said handling means into said first register;

means coupled to said first register for comparing each byte of data being transferred into said register with the corresponding byte previously stored in said register;

a second register having the capacity to store one bit of information for each byte in a word unit of data;

second means coupled to said comparing means for transferring a primary code bit of information into said second register in response to each byte comparison output of said comparing means;

second means coupled to said second register for comparing the inputs thereto with the previous outputs thereof in byte units;

means coupled to said first and second transferring means and to said second comparing means for selecting said data bytes, in accordance with the values of the corresponding primary code bits, for selecting byte units of said primary code bits in accordance with the secondary code defined by the output of said second comparing means and for assembling the selected data and primary code bytes together with said secondary code, into contiguous reversibly reduced output words of information;

means for handling said output words on a real time basis; and means for coordinating the operations of said data and output word handling means to maintain a steady flow of information into said output word handling means, despite the variable length of said output words, said coordinating means including:

means for detecting gap conditions in the flow of information from said data handling means through said assembling means into said output word handling means, due to either a leading or lagging delivery of data by said data handling means;

means responsive to lagging delivery of data to control insertion of distinctive NO DATA filler-bytes into the output word stream delivered to said output word handling means; and means responsive to leading delivery of data to suppress one or more words of data at said data handling means and to insert a distinctive LOST DATA bit indicative of the place in the output stream which would have been occupied by output words corresponding to said suppressed words.

7. In a data reduction system, a source of signal bit representations arranged to form data code words each having a first predetermined number of bits;

first means coupled to said source for comparing corresponding parts of consecutive data code words to produce first level control code bit representations indicative of identity and non-identity of the compared parts having a second predetermined number of bits less than said first predetermined number;

second means coupled to said first comparing means for comparing parts of said firt level control codes to produce second level control codes indicative of identity and non-identity of said compared parts of first codes having a third predetermined number of bits per word less than said second predetermined number.

means coupled to said source and to said first and second comparing means for selecting plural-bit parts of said data code words under the control of corresponding bits of said first level codes and plural-bit parts of said first level codes under the control of corresponding bits of said second level codes; and means operable on a real time basis with reference to said comparing means for combining said second level codes and said selected parts of said first level codes and data code words into unitary codes having a variable number of equal duration bits per word.

8. A system for reversibly reducing data signals occurring at varying intervals on a real time basis:

a source of fixed length data signal words delivered sequentially at varying intervals of time;

means for storing information signals at a predetermined rate;

means operable sequentially on a real time basis for converting said source data words into variable length output words corresponding to said data words and having, on the average, a reduced length;

means for transferring said output words in sequence into said storing means at the said predetermined rate;

means operable to detect a hiatus in or over-supply of information flowing towards said storing means; and means responsive to the output of said detecting means to insert distinctive continuity information between certain of said output words to maintain a continuous flow of meaningful information at said predetermined rate into said storing means.

9. Data converting apparatus for converting information signals selectively in real time from an irregularly timed signal format at a source to a regularly timed signal format at the input to a receiver adapted to receive only regularly timed signals, wherein the average rate of recurrence of signals at the source is expected to exceed the fixed recurrence rate to which the receiver input is adapted, comprising:

buffer means of relatively limited capacity, coupled to receive and queue for further handling groups of information signals produced at said source;

means for indicating conditions of total vacancy and total occupancy in said buffer means;

means coupled to said indicating means for enabling information signaled from said source to be entered into said buffer means and for enabling information to be transferred out of said buffer means so long as a condition of at least partial occupancy exists therein;

means for transferring information as signals from said buffer means, subject to control by said enabling means;

means coupled to said buffer means and transferring means for generating control signals bearing predetermined relationships to said total vacancy and total occupancy conditions and to the conditions of redundancy of portions of the information transferred out of said buffer means;

means cooperative with said transferring means for appending said control signals to the associated portions of transferred information;

assembly means responsive to said vacancy and occupancy conditions and said control signals for selecting portions of said transferred information and control signals for further handling; and means coupled to said assembly means for transferring regularly timed signals, corresponding to the reduced information selected by said assembly means, to said receiver.

10. Apparatus in accordance with claim 9 wherein said control signals generated by said generating means include first and second groups of control signals, the signals of the second group bearing a predetermined relationship to portions of the signals of the first group; and wherein said assembly means is effective to select said portions of said first groups of control signals in response to said signals of said second group of control signals.

References Cited

UNITED STATES PATENTS

| | | | |
|---|---|---|---|
| 3,022,005 | 2/1962 | Dickinson | 235—152 |
| 3,177,352 | 4/1965 | Hamburgen | 235—183 |
| 3,185,823 | 5/1965 | Ellersick | 235—154 |
| 3,185,824 | 5/1965 | Blasbalg | 235—154 |
| 3,213,268 | 10/1965 | Ellersick | 235—154 |
| 3,233,236 | 2/1966 | Katzenstein | 340—347 |
| 3,237,170 | 2/1966 | Blasbalg | 340—172.5 |
| 3,278,907 | 10/1966 | Barry | 340—172.5 |
| 3,311,893 | 3/1967 | Landell | 340—172.5 |
| 3,354,466 | 11/1967 | Herold et al. | 340—146.2 |

MAYNARD R. WILBUR, Primary Examiner

G. R. EDWARDS, Assistant Examiner

U.S. Cl. X. R.

340—172.5, 347